(12) United States Patent
Roche et al.

(10) Patent No.: US 9,053,577 B2
(45) Date of Patent: Jun. 9, 2015

(54) REFLECTING VALUES FOR A METRIC IN A DISPLAY

(75) Inventors: Rory Fergus Roche, Bristol (GB); Rycharde Jeffery Hawkes, Bristol (GB); Lee Carrotte, Bristol (GB); Julio Guijarro, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 714 days.

(21) Appl. No.: 13/282,564

(22) Filed: Oct. 27, 2011

(65) Prior Publication Data

US 2013/0106906 A1    May 2, 2013

(51) Int. Cl.
*G06T 11/20*    (2006.01)

(52) U.S. Cl.
CPC ................... *G06T 11/206* (2013.01)

(58) Field of Classification Search
CPC ..................................... G06T 11/206
USPC ..................................... 345/440.2
See application file for complete search history.

(56) References Cited

U.S. PATENT DOCUMENTS

| | | | |
|---|---|---|---|
| 5,664,187 A * | 9/1997 | Burkes et al. ................. | 711/114 |
| 6,966,033 B1 | 11/2005 | Gasser et al. | |
| 7,698,706 B2 | 4/2010 | Bantz et al. | |
| 2003/0006988 A1 | 1/2003 | Alford et al. | |
| 2009/0113323 A1 | 4/2009 | Zhao et al. | |
| 2009/0172666 A1 * | 7/2009 | Yahalom et al. .................. | 718/1 |
| 2009/0237404 A1 | 9/2009 | Cannon, III | |
| 2010/0293270 A1 | 11/2010 | Augenstein et al. | |
| 2010/0313145 A1 | 12/2010 | Dillenberger et al. | |
| 2011/0055711 A1 | 3/2011 | Jaquot et al. | |
| 2011/0055712 A1 | 3/2011 | Trung et al. | |

OTHER PUBLICATIONS

N.S. Bowen and R. Chillarege, Failure Prevention and Error Repair for Overlays on Code and Data, Jan. 1, 1990, IBM Technical Disclosure Bulletin, Jan. 1990, US, vol. No. 32, No. 8B, pp. 96-100.*
International Search Report and Written Opinion dated Apr. 24, 2012 issued on PCT/US2011/057971 filed on Oct. 27, 2011, Korean Intellectual Property Office.

* cited by examiner

*Primary Examiner* — Jeffery A Brier
(74) *Attorney, Agent, or Firm* — Hewlett-packard Patent Department

(57) ABSTRACT

A visual representation of a set of instantiated virtualized resources may be displayed and include a linear row of graphical representations of individual ones of a set of instantiated virtualized resources. In addition, a performance-related metric for individual ones of the set of instantiated virtualized resources may be monitored, and the display may be caused to reflect values for the metric for the individual instantiated virtualized resources in connection with the corresponding graphical representations of the individual instantiated virtualized resources.

17 Claims, 15 Drawing Sheets

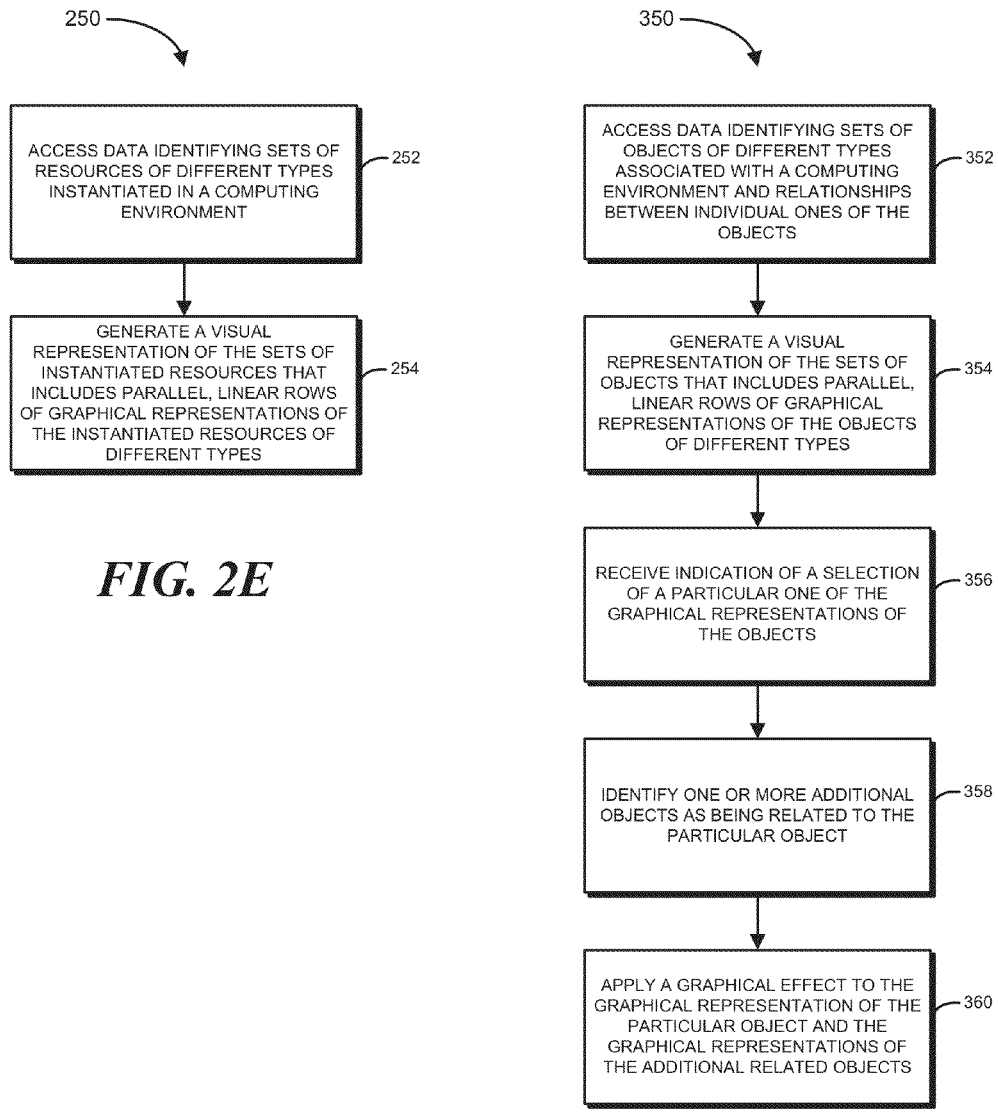

REFLECTING VALUES FOR A METRIC IN A DISPLAY

BACKGROUND

The virtualized infrastructure provided by a cloud computing service may include a very large number of different resources. In addition, a very large number of users may use the virtualized infrastructure provided by a cloud computing service. Consequently, visually representing the different resources of the virtualized infrastructure provided by a cloud computing service, the different users of the virtualized infrastructure provided by the cloud computing service, relationships therebetween, and/or real-time operational metrics related to the performance of the virtualized infrastructure of the cloud computing service may pose challenges.

BRIEF DESCRIPTION OF THE DRAWINGS

FIG. 2E is a flowchart that illustrates an example of a process for generating a visual representation of different sets of instantiated resources.

FIG. 3B is a flowchart that illustrates an example of a process for reflecting relationships between different objects within a visual representation of sets of different objects.

DETAILED DESCRIPTION

A virtualized infrastructure provided by a cloud computing service may include a very large number of different resources. For example, among other resources, the virtualized infrastructure provided by the cloud computing service may provide many hundreds, thousands, hundreds of thousands, or more virtual machines, similar numbers of virtualized storage resources (e.g., virtual disks), similar numbers of virtual network connections, etc. In addition, hundreds, thousands, hundreds of thousands, or more users may use the virtualized infrastructure provided by the cloud computing service.

Figure 1A:
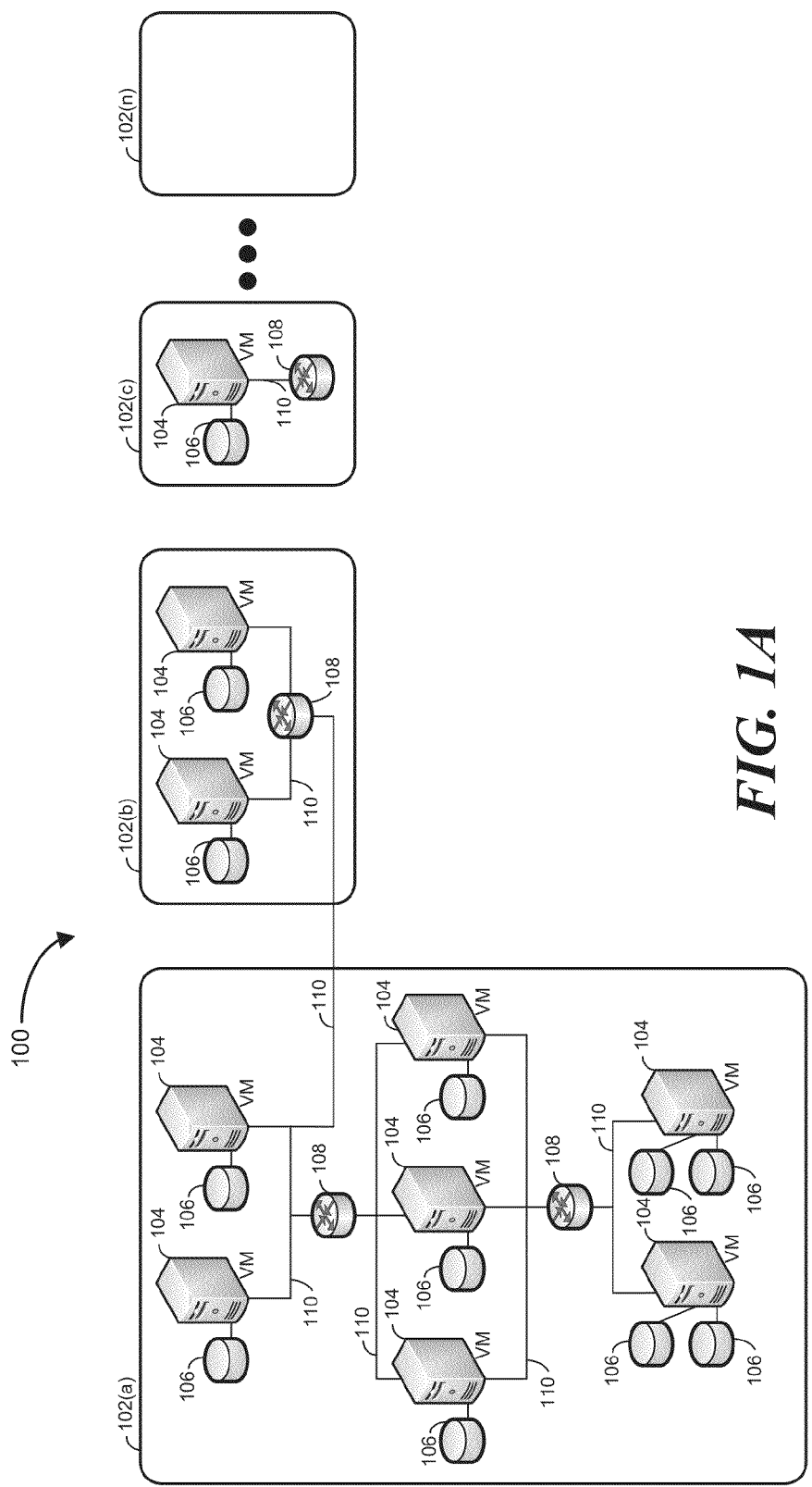
FIG. 1A is a block diagram of an example of a virtualized infrastructure for a cloud computing service.

FIG. 1A is a block diagram of an example of a virtualized infrastructure 100 for a cloud computing service. As illustrated in FIG. 1A, the virtualized infrastructure 100 includes a number of groups 102 of virtual resources that are managed together and that are referred to herein as cells. Depending on the implementation, the virtualized infrastructure 100 may include a very large number of cells 102, for example, numbering in the hundreds, thousands, hundreds of thousands or even more.

Cells 102 may be created, deployed, and deleted by users of the cloud computing service (e.g., application developers who host services or other applications running on the virtualized infrastructure 100 provided by the cloud computing service). As part of the process of creating and deploying a cell 102, a user may define the constituent resources that comprise the cell 102 including, for example, one or more virtual machines 104, one or more virtualized storage resources 106, one or more virtual routers 108, and/or one or more virtual network connections 110 connecting different resources within the cell 102 to each other and/or to additional resources external to the cell (e.g., resources of another cell 102 and/or the Internet). In addition, the user may define specific properties of the virtual machines 104 and/or virtualized storage resources 106 within the cell 102, including, for example, which virtual machines 104 are connected to which virtualized storage resources 106. Furthermore, the user also may define a security policy for the cell 102, for example, controlling the visibility of different resources both inside and outside of the cell 102. As with the number of cells 102, depending on the implementation, the virtualized infrastructure 100 may include very large numbers of virtual machines 102, virtualized storage resources 106, virtual routers 108, and virtual network connections 100, each, for example, numbering in the hundreds, thousands, hundreds of thousands, or more.

The virtualized infrastructure 100 illustrated in FIG. 1A is just one example of a virtualized infrastructure that may be provided by a cloud computing service. However, the virtualized infrastructures provided by cloud computing services may be implemented in a variety of different configurations, include a variety of different resources, and support a variety of different functionality. Irrespective of how a virtualized infrastructure provided by a cloud computing service is configured, though, the virtualized infrastructure is implemented by a physical infrastructure including, for example, one or more computing devices (e.g., servers), one or more physical network links, etc.

Figure 1B:
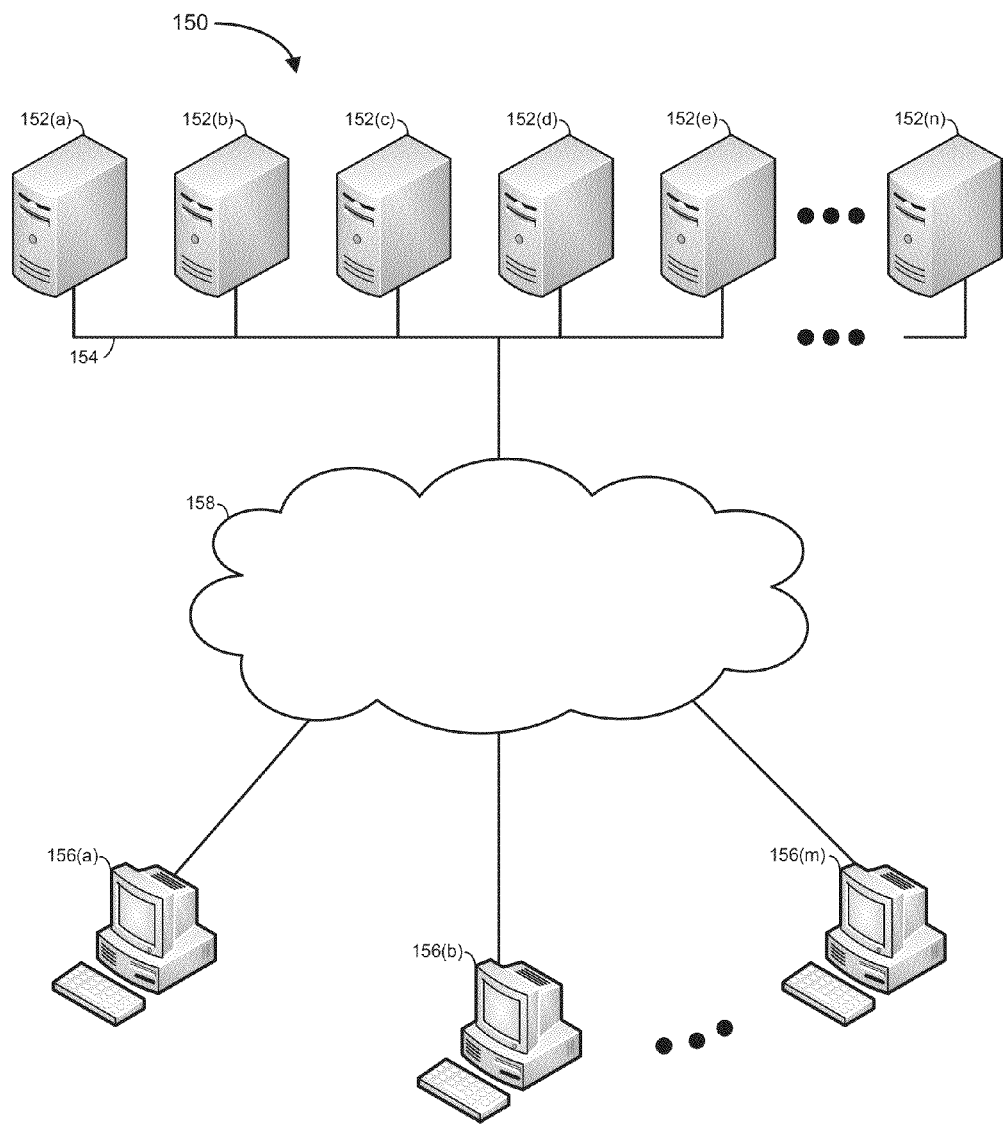
FIG. 1B is a block diagram of an example of a physical infrastructure for a cloud computing service.

FIG. 1B is a block diagram of an example of a physical infrastructure 150 for a cloud computing service. As illustrated in FIG. 1B, the physical infrastructure 150 includes a number of host computing devices 152 that are connected by physical network links 154 (e.g., wired network links or wireless network links such as optical and/or radio frequency (RF) network links) and that are operated by the cloud computing service provider. In some implementations, host computing devices 152 may be servers having one or more processors for executing instructions stored in storage and/or received from one or more other electronic devices as well as internal or external storage components storing data and programs such as native operating systems and/or hypervisors. The native operating systems and/or hypervisors may be implemented as instructions that are stored in the storage components and that, when executed by the processors, enable virtualization of host computing devices 152 to enable provision of a virtualized infrastructure, such as, for example the virtualized infrastructure 100 illustrated in FIG. 1A. In addition, one or more of host computers 152 also may operate to facilitate management of the virtualized infrastructure and use of the virtualized infrastructure by users of the cloud computing service (e.g., application developers who host services or other applications running on the virtualized infrastructure). Such host computers 152 may store application programs in their associated storage components that, when executed by the processors of the host computers 152, provide, among other functionality, graphical user interfaces (GUIs) intended to facilitate the management and use of the virtualized infrastructure of the cloud computing service.

Physical infrastructure 150 also includes user computing devices 156 communicatively coupled to host computing devices 152 by a network 158. User computing devices 156 may be any of a number of different types of computing devices including, for example, personal computers, special purpose computers, general purpose computers, combinations of special purpose and general purpose computers, laptop computers, tablet computers, netbook computers, smart phones, mobile phones, personal digital assistants, etc. User computing devices 156 typically have one or more processors for executing instructions stored in storage and/or received from one or more other electronic devices as well as internal or external storage components for storing data and programs such as an operating system and one or more application programs.

One or more of user computing devices 156 may be used by administrators of the virtualized infrastructure provided by the cloud computing service to monitor and manage the operation of the virtualized infrastructure provided by the cloud computing service as well as the physical infrastructure 150 underlying it. One or more of user computing devices 156 also may be used by users of the virtualized infrastructure provided by the cloud computing service (e.g., application developers who host services or other applications running on the virtualized infrastructure) to create, deploy, and manage resources on the virtualized infrastructure provided by the cloud computing service. Additionally or alternatively, one or more of user computing devices 156 may be used by users of the applications or services hosted on the cloud computing system to access such hosted applications or services.

In some implementations, user computing devices 156 that are used by administrators of the virtualized infrastructure provided by the cloud computing service may store application programs in their storage components that, when executed by the processors of the user computing devices 156, provide, among other functionality, GUIs intended to facilitate the monitoring and management of the operation of the virtualized infrastructure provided by the cloud computing service as well as the physical infrastructure 150 underlying it. Similarly, in some implementations, user computing devices 156 that are used by users of the virtualized infrastructure provided by the cloud computing service may store application programs in their storage components that, when executed by the processors of the user computing devices 156, provide, among other functionality, graphical user interfaces GUIs intended to facilitate the creation, deployment, and management of resources on the virtualized infrastructure provided by the cloud computing service.

Network 158 may provide direct or indirect communication links between user computing devices 156 and host computing devices 152. Examples of network 158 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

The physical infrastructure 150 illustrated in FIG. 1B is just one example of a physical infrastructure for a cloud computing service. The physical infrastructures on which virtualized infrastructures provided by cloud computing services are implemented may be configured in a variety of different ways.

FIGS. 2A-2D are diagrams of an example of a GUI 200 for a cloud computing service. More particularly, FIGS. 2A-2D are diagrams of an example of a GUI 200 intended to facilitate the monitoring and management of different aspects of the virtualized infrastructure 100 illustrated in FIG. 1A. Furthermore, the GUI 200 illustrated in FIGS. 2A-2D may be displayed on a display device associated with one or more of user computing devices 156 of FIG. 1B. In fact, in some implementations, storage components associated with one or more of user computing devices 156 may store computer-readable instructions that, when executed by the processors of the one or more user computing devices 156, cause the one or more user computing devices 156 to generate and display the GUI 200, for example, based on information about the virtualized infrastructure received from one or more of host computing devices 152. In alternative implementations, storage components associated with one or more of host computing devices 152 may store computer-readable instructions that, when executed by the processors of the one or more host computing devices 156, cause the one or more host computing devices 156 to generate the GUI 200. In such implementations, the one or more host computing devices 156 then may transmit instructions to one or more of the user computing devices 156 that cause the one or more user computing devices 156 to display the GUI on display devices associated with the one or more user computing devices 156.

Figure 2A:
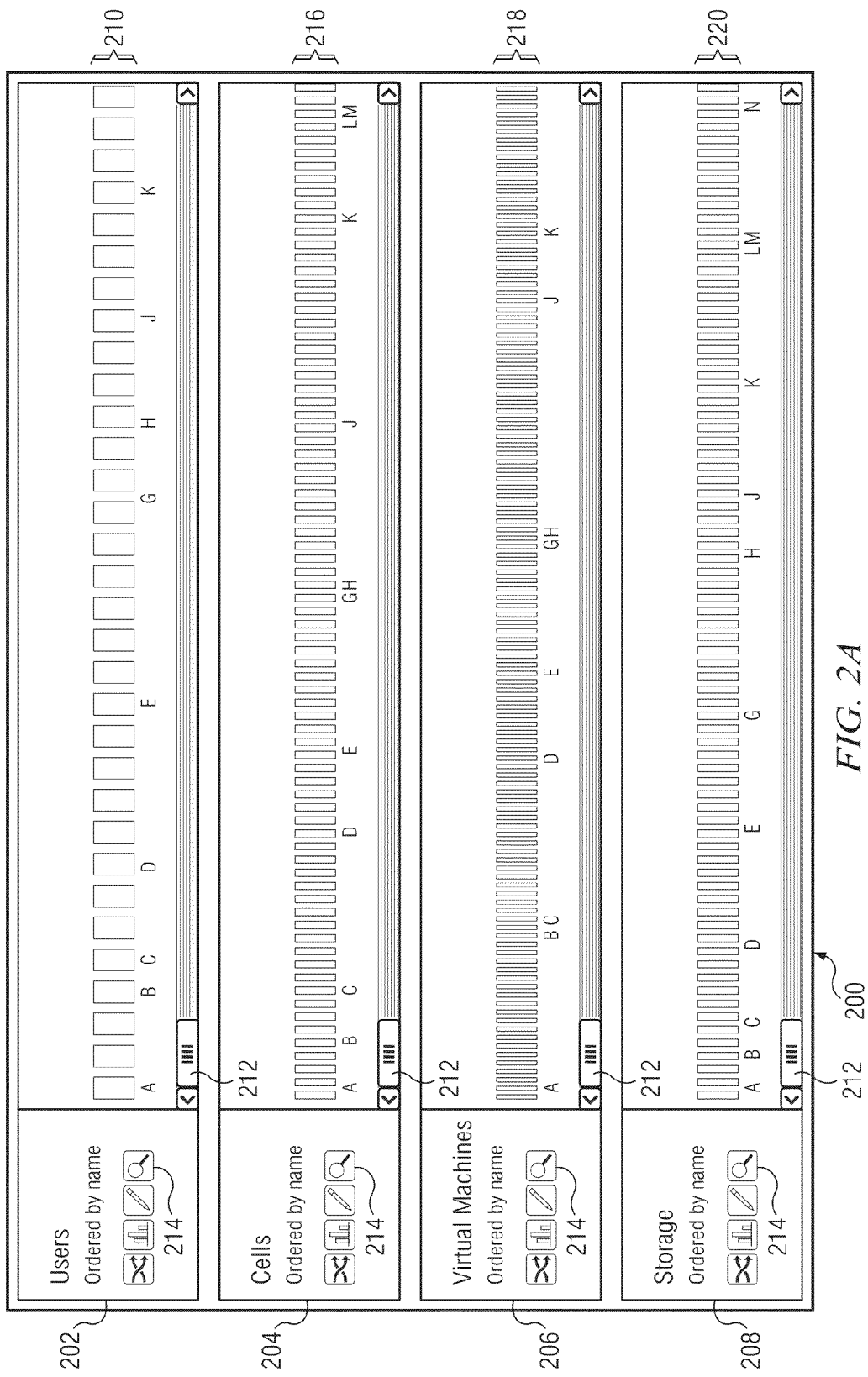
FIGS. 2A-2D, 3A, 4A, 5A-5D, and 6 are diagrams of an example of a graphical user interface (GUI) for a cloud computing service.

Referring initially to FIG. 2A, the GUI 200 includes a "Users" panel 202, a "Cells" panel 204, a "Virtual Machines" panel 206, and a "Storage" panel 208.

"Users" panel 202 includes a visual representation 210 of the current users of the virtualized infrastructure (e.g., application developers who host services or other applications running on the virtualized infrastructure). In particular, the users who presently have accounts registered with the cloud computing service provider that enable the users to create and deploy resources (e.g., cells, virtual machines, and/or virtualized storage resources) on the virtualized infrastructure are represented by a horizontal, linear row of rectangles 210 (which may be referred to as a "string"), where each individual user is represented graphically by a corresponding rectangle.

A user of the virtualized infrastructure represented by a rectangle within "Users" string 210 need not necessarily correspond to one individual user. For example, in some cases, a company may maintain a registered account with the cloud computing service provider that enables the company to create and deploy resources on the virtualized infrastructure. In such cases, multiple representatives of the company who are responsible for managing the company's account with the cloud computing service providers all may be represented as a single user. In other cases, a rectangle within "Users" string 210 may correspond to one individual user (e.g., a specific individual within a company who maintains a registered account with the cloud computing service provider or a sole developer who maintains a registered account with the cloud computing service provider and who is not affiliated with any other business concern).

As illustrated in FIG. 2A, the graphical representations of the users of the virtualized infrastructure in "Users" string 210 are arranged alphabetically from left to right according to their user names. As also illustrated in FIG. 2A, "Users" string 210 extends beyond the horizontal, visual extent of "Users" panel 202. Consequently, "Users" panel 202 includes a slider bar 212 invokable by a user to cause GUI 200 to scroll "Users" string 210 left and right to change the portion of "Users" string 210 that is visible within "Users" panel 202. "Users" panel 202 also includes a selectable zoom control 214 invokable by a user to cause GUI 200 to change the horizontal scale of the display of the rectangles within "Users" string 210, thereby modifying the portion of "Users" string 210 that is visible within "Users" panel 202.

"Cells" panel 204 includes a visual representation 216 of the cells currently deployed on the virtualized infrastructure by users of the virtualized infrastructure. In particular, the cells currently deployed on the virtualized infrastructure are represented by a horizontal, linear row of rectangles 216 (which may be referred to as a "string"), where each individual cell is represented graphically by a corresponding rectangle. As illustrated in FIG. 2A, the graphical representations of the cells deployed on the virtualized infrastructure in "Cells" string 216 are arranged alphabetically from left to right according to names assigned to the cells. As also illustrated in FIG. 2A, "Cells" string 216 extends beyond the horizontal, visual extent of "Cells" panel 204. Consequently, "Cells" panel 204 includes a slider bar 212 invokable by a user to cause GUI 200 to scroll "Cells" string 216 left and right to change the portion of "Cells" string 216 that is visible within "Cells" panel 204. "Cells" panel 204 also includes a selectable zoom control 214 invokable by a user to cause GUI 200 to change the horizontal scale of the display of the rectangles within "Cells" string 216, thereby modifying the portion of "Cells" string 216 that is visible within "Cells" panel 204.

"Virtual machines" panel 206 includes a visual representation 218 of the virtual machines currently deployed within cells instantiated in the virtualized infrastructure. In particular, the virtual machines currently deployed within cells instantiated in the virtualized infrastructure are represented by a horizontal, linear row of rectangles 218 (which may be referred to as a "string"), where each individual virtual machine is represented graphically by a corresponding rectangle. As illustrated in FIG. 2A, the graphical representations of the virtual machines deployed in cells instantiated on the virtualized infrastructure in "Virtual Machines" string 218 are arranged alphabetically from left to right according to names assigned to the virtual machines. As also illustrated in FIG. 2A, "Virtual Machines" string 216 extends beyond the horizontal, visual extent of "Virtual Machines" panel 206. Consequently, "Virtual Machines" panel 206 includes a slider bar 212 invokable by a user to cause GUI 200 to scroll "Virtual Machines" string 218 left and right to change the portion of "Virtual Machines" string 218 that is visible within "Virtual Machines" panel 206. "Virtual Machines" panel 206 also includes a selectable zoom control 214 invokable by a user to cause GUI 200 to change the horizontal scale of the display of the rectangles within "Virtual Machines" string 218, thereby modifying the portion of "Virtual Machines" string 218 that is visible within "Virtual Machines" panel 206.

"Storage" panel 208 includes a visual representation 220 of the virtualized storage resources currently deployed within cells instantiated in the virtualized infrastructure. In particular, the virtualized storage resources currently deployed within cells instantiated in the virtualized infrastructure are represented by a horizontal, linear row of rectangles 220 (which may be referred to as a "string"), where each individual virtualized storage resource is represented graphically by a corresponding rectangle. As illustrated in FIG. 2A, the graphical representations of the virtualized storage resources deployed in cells instantiated on the virtualized infrastructure in "Storage" string 220 are arranged alphabetically from left to right according to names assigned to the virtualized storage resources. As also illustrated in FIG. 2A, "Storage" string 220 extends beyond the horizontal, visual extent of "Storage" panel 220. Consequently, "Storage" panel 208 includes a slider bar 212 invokable by a user to cause GUI 200 to scroll "Storage" string 220 left and right to change the portion of "Storage" string 220 that is visible within "Storage" panel 208. "Storage" panel 208 also includes a selectable zoom control 214 invokable by a user to cause GUI 200 to change the horizontal scale of the display of the rectangles within "Storage" string 220, thereby modifying the portion of "Storage" string 220 that is visible within "Storage" panel 208.

As discussed above, the "Users" panel 202, the "Cells" panel 204, the "Virtual Machines" panel 206, and the "Storage" panel 208 all include slider bars 212. In response to user selection and manipulation of the slider bar 212 (e.g., via a computer mouse click and subsequent user mouse movement) in any particular one of the panels, the computing device that generates GUI 200 updates GUI 200 by scrolling the view of the corresponding string of the graphical representations of resources associated with the particular panel to the left or right in accordance with the manipulation of the slider bar 212 by the user. For example, referring to FIG. 2B, in response to user selection of slider bar 212 in "Users" panel 202 and subsequent manipulation from left to right, the computing device that generates GUI 200 updates GUI 200 by scrolling the view of "Users" string 210 from left to right.

As also discussed above, the "Users" panel 202, the "Cells" panel 204, the "Virtual Machines" panel 206, and the "Storage" panel 208 all include selectable zoom controls 214. In response to user selection and manipulation of the zoom control 214 (e.g., via a computer mouse click) in any particular one of the panels, the computing device that generates GUI 200 updates GUI 200 by increasing or decreasing the horizontal scale of the display of the corresponding string of the graphical representations of resources associated with the particular panel in accordance with the manipulation of the zoom control 214 by the user. For example, referring to FIG. 2C, in response to user selection of zoom control 214 of "Cells" panel 204, the computing device that generates GUI 200 updates GUI 200 by increasing the horizontal scale of "Cells" string 216. Stated differently, the computing device that generates GUI 200 updates GUI by zooming in on the portion of "Cells" string 216 displayed in "Cells" panel 204. Consequently, fewer of the graphical representations of individual cells in "Cells" string 216 are displayed within "Cells" panel 204 than in FIG. 2A. However, those graphical representations of individual cells that are displayed within "Cells" panel 204 are larger and more easily identifiable and selectable than in FIG. 2A.

In some implementations, GUI 200 may provide additional or alternative mechanisms for zooming in on or out from the strings of the "Users" panel 202, the "Cells" panel 204, the "Virtual Machines" panel 206, and the "Storage" panel 208. For example, in some implementations, GUI 200 may provide a mechanism that enables a user to select a range of consecutive graphical representations of objects from any one particular string of objects (e.g., via a computer mouse click and drag operation to draw a box around a selected group of graphical representations of objects within a string). In such implementations, in response to user selection of a range of consecutive graphical representations of objects from a particular string, the computing device that generates GUI 200 updates GUI 200 by zooming in on the selected group of graphical representations of objects in the string. In some cases, this may involve maximizing the horizontal scale of the graphical representations of the selected group such that the selected group of graphical representations of objects consumes the entire horizontal, visual extent of the string to which the selected group belongs. In other cases, this mechanism may be employed to set two or more different zoom levels for different groups of graphical representations of objects within the string.

Referring again to FIG. 2A, each rectangle in "Users" string 210 represents a user of the virtualized infrastructure, each rectangle in "Cells" string 216 represents a cell deployed on the virtualized infrastructure, each rectangle in "Virtual Machine" string 218 represents a virtual machine deployed within a cell instantiated in the virtualized infrastructure, and each rectangle in "Storage" string 220 represents a virtualized storage resource deployed within a cell instantiated in the virtualized infrastructure. Thus, all of the users of the virtualized infrastructure, all of the cells deployed on the virtualized infrastructure, and all of the virtual machines and virtualized storage resources deployed within cells instantiated in the virtualized infrastructure may be represented graphically conveniently in a single GUI even when the number of users, cells, virtual machines, and virtualized storage resources all number in the hundreds, thousands, hundreds of thousands, or more.

In some implementations, GUI 200 may provide a filter feature that enables a user to filter the objects represented graphically in any one of "Users" string 210, "Cells" string 216, "Virtual Machines" string 218, and "Storage" string 220. For example, in response to a user employing the filter feature to cause GUI 200 to filter "Users" string 210 to be limited to a particular user, the computing device that generates GUI 200 may update GUI 200 such that only a graphical representation of the particular user is displayed within "Users" string 210, only graphical representations of cells created and deployed by the particular user are displayed within "Cells" string 216, and only graphical representations of such cells' constituent virtual machines and virtualized storage resources are displayed within "Virtual Machines" and "Storage" strings 206 and 208. Continuing with this example, in response to a user then employing the filter feature to cause GUI 200 to filter "Cells" string 216 to be limited to one or more specific cells created and deployed by the particular user, the computing device that generates GUI 200 may update GUI 200 such that only graphical representations of the specific cells are displayed within "Cells" string 216 and only graphical representations of the constituent virtual machines and virtualized storage resources of the specific cells are displayed within "Virtual Machines" and "Storage" strings 206 and 208.

Figure 2B:
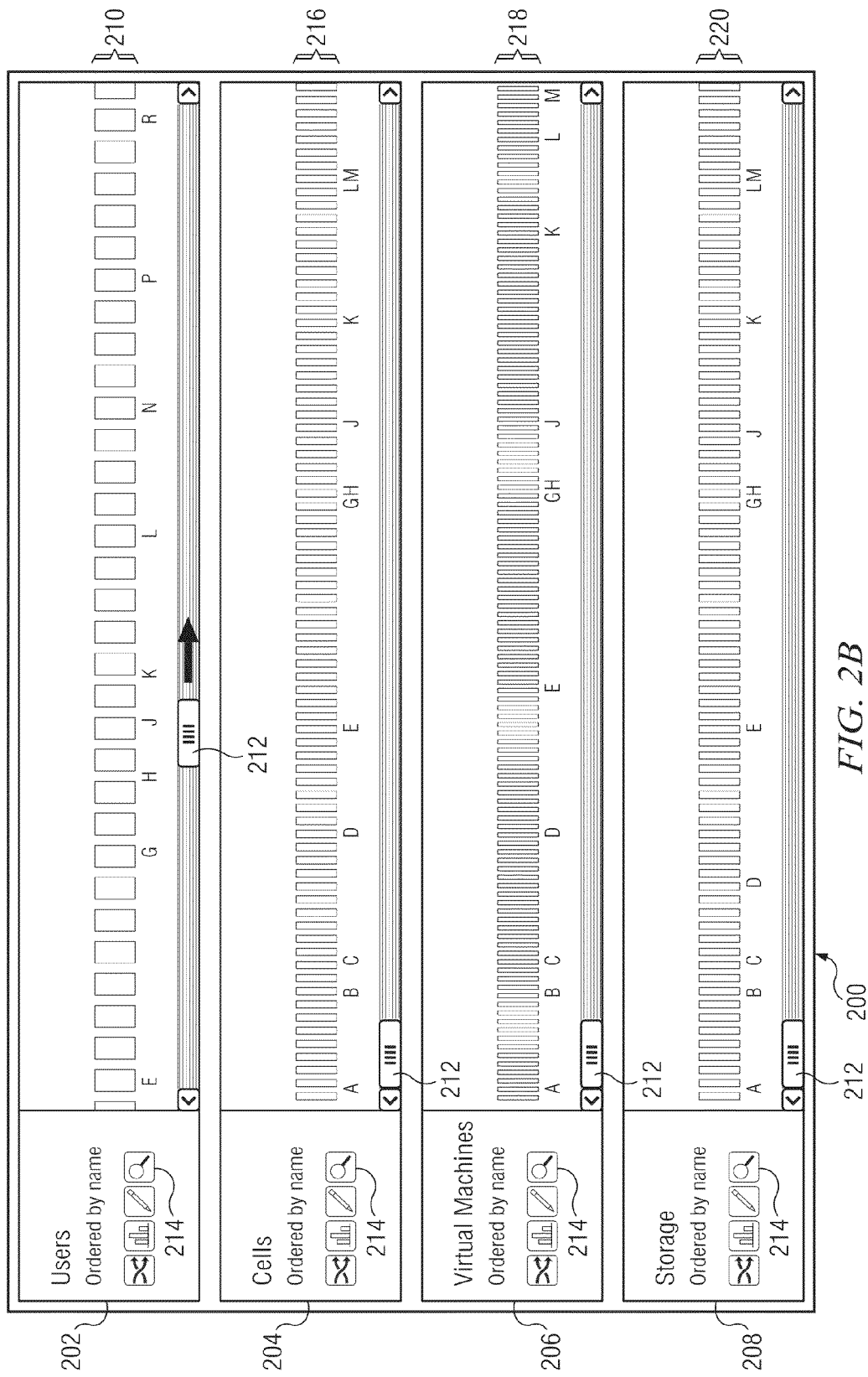
Figure 2C:
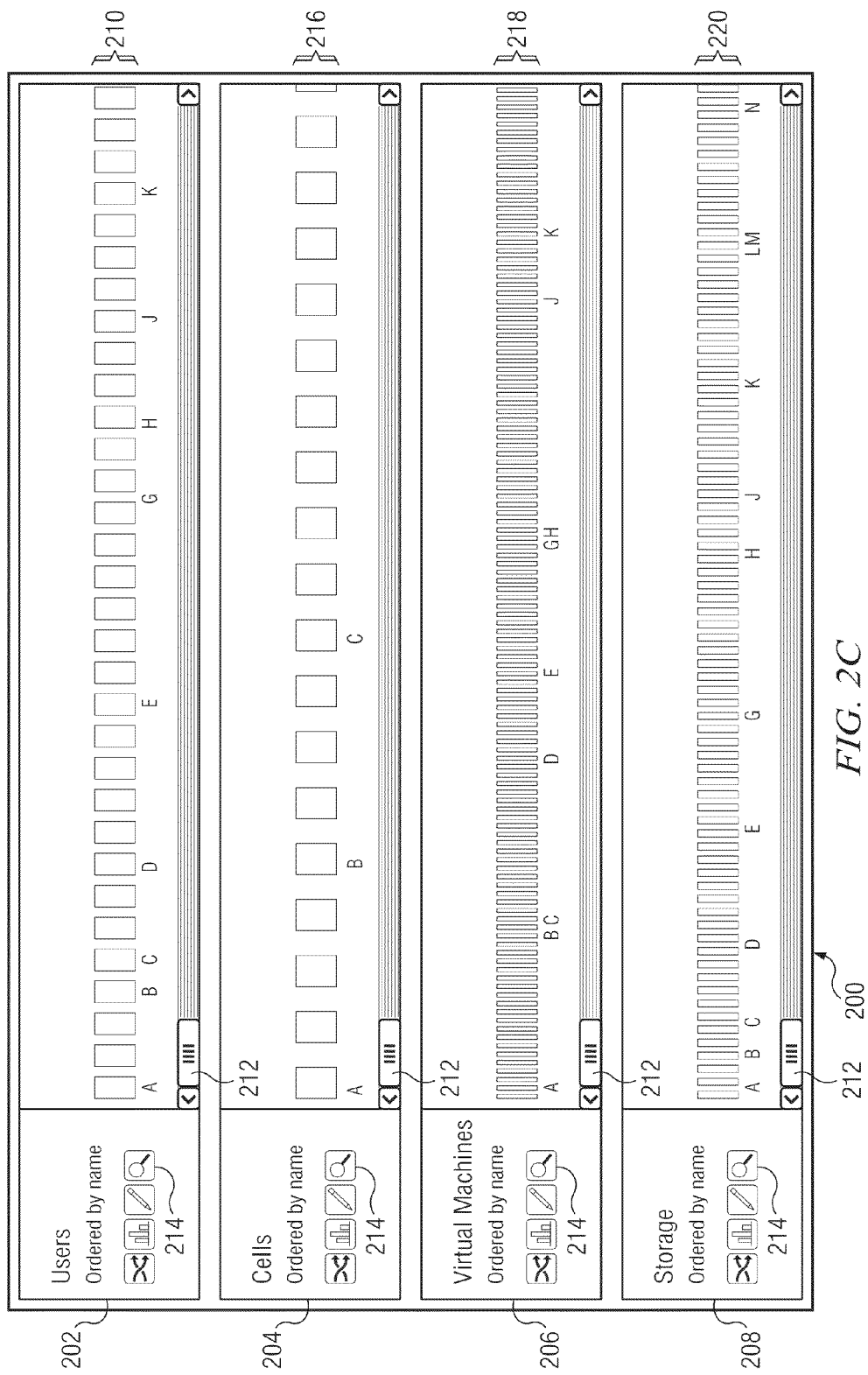
Figure 2D:
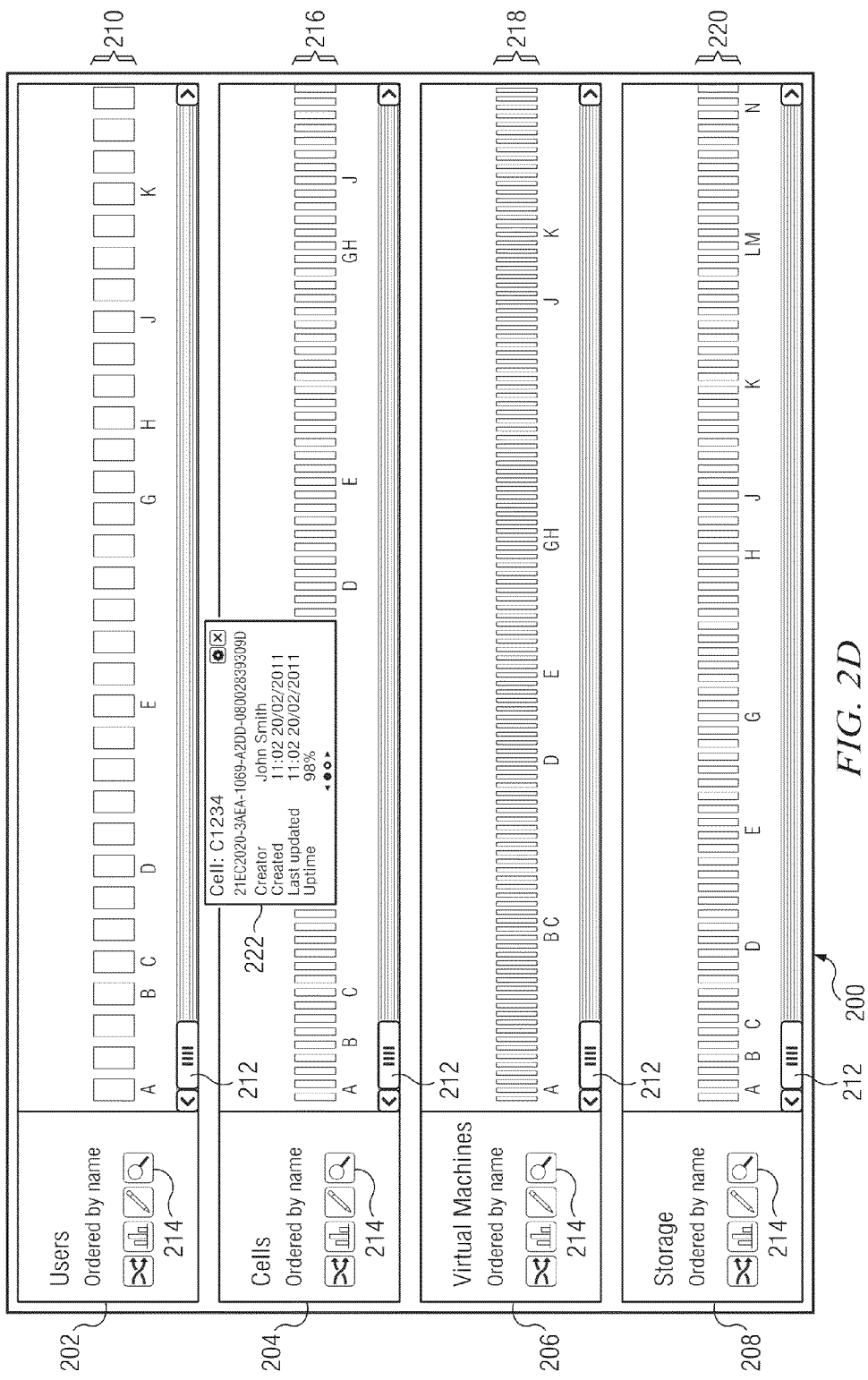

As illustrated in FIGS. 2B and 2C and described above, a user may use the filter feature, the slider bar 212, and/or the selectable zoom control 214 provided in connection with any particular one of the "Users" panel 202, the "Cells" panel 204, the "Virtual Machines" panel 206, and the "Storage" panel 208 to navigate through the potentially vast number of different graphical representations of the objects (e.g., users, cells, virtual machines, or virtualized storage resources) represented in the particular panel to locate the graphical representation of a desired one of the objects. However, as illustrated in FIGS. 2A-2C, the rectangular graphical representations of the users, cells, virtual machines, and virtualized storage resources do not convey much information about the individual users, cells, virtual machines, and virtualized storage resources that they represent beyond their mere existence. As a result, even if a user is successful in using the slider bar 212 and/or selectable zoom control 214 provided in connection with a particular panel to locate the graphical representation of a desired object represented in the particular panel, without more, the graphical representation of the object may be of limited utility to the user.

Consequently, GUI 200 may be configured to provide more detailed information about any one of the objects (e.g., users, cells, virtual machines, or virtualized storage resources) represented in GUI 200 in response to user selection of the object within the GUI 200 (e.g., via a double computer mouse click). For example, referring now to FIG. 2D, in response to user selection of rectangle 222 within the "Cells" string 216 in the "Cells" panel 204 of GUI 200, the computing device that generates GUI 200 updates GUI 200 by expanding rectangle 222 and providing more detailed information about the cell represented by rectangle 222. For example, expanded rectangle 222 provides the name of the cell represented by rectangle 222 and details including the name of the user who created the cell, the time at which the cell was created, the time at which the cell was updated most recently, and statistics about the cell's uptime. GUI 200 also may be configured to provide similar more detailed information about any of the other objects represented in GUI 200 irrespective of whether such objects also are cells represented by rectangles in the "Cells" string 216 or, instead, are users represented by rectangles in the "Users" string 210, virtual machines represented by rectangles in the "Virtual Machines" string 218, or virtualized storage resources represented by rectangles in the "Storage" string 220.

FIG. 2E is a flowchart 250 that illustrates an example of a process for generating a visual representation of different sets of instantiated resources. For example, the process illustrated in the flowchart 250 of FIG. 2E may be performed to generate a visual representation of different sets of resources instantiated in a virtualized infrastructure provided by a cloud computing service, such as, for example, the GUI 200 illustrated in FIGS. 2A-2D. Furthermore, the process illustrated in the flowchart 250 may be performed by one or more computing devices such as, for example, one or more of host computing devices 152 of FIG. 1B, one or more of user computing devices 156 of FIG. 1B, or a combination of one or more of host computing devices 152 and one or more of user computing devices 156 of FIG. 1B.

At 252, data identifying sets of resources of different types that have been instantiated in a computing environment (e.g., two or more of a set of cells instantiated in a virtualized computing infrastructure, a set of virtual machines instantiated in a virtualized computing infrastructure, and a set of virtualized storage resources instantiated in a virtualized computing infrastructure) is accessed. Then, at 254, a visual representation of the sets of instantiated resources is generated that includes parallel, linear rows of graphical representations of the instantiated resources of different types. For example, the visual representation may represent each set of instantiated resources of a given type graphically as a "string" of rectangles as in the "Cells" string 210, the "Virtual Machines" string 218, and the "Storage" string 220 illustrated in the GUI 200 of FIGS. 2A-2D.

Referring again to FIG. 1A, a user of the virtualized infrastructure 100 provided by the cloud computing service provider may create and deploy a number of different cells in the virtualized infrastructure 100, and each such cell may have one or more virtual machines 104 and/or one or more virtualized storage resources 106. Consequently, when the different resources instantiated in the virtualized infrastructure 100 are represented visually in a GUI such as GUI 200 of FIGS. 2A-2D, relationships may exist between individual ones of the different resources even if they are of different types. For example, all of the cells 102 created and deployed in the virtualized infrastructure 100 by a particular user may be considered to be related to the user and/or to each other. Similarly, all of the virtual machines 104 and all of the virtualized storage resources 106 included within the cells 102 created and deployed by the particular user may be considered to be related to the cells 102 in which they are contained, the particular user who created the cells in which they are contained, other of the cells 102 created by the particular user who created the cells 102 in which they are contained, and/or to each other. Consequently, in some implementations, GUI 200 may be configured to visually represent relationships between different ones of the objects visually represented within the GUI 200.

Figure 3A:
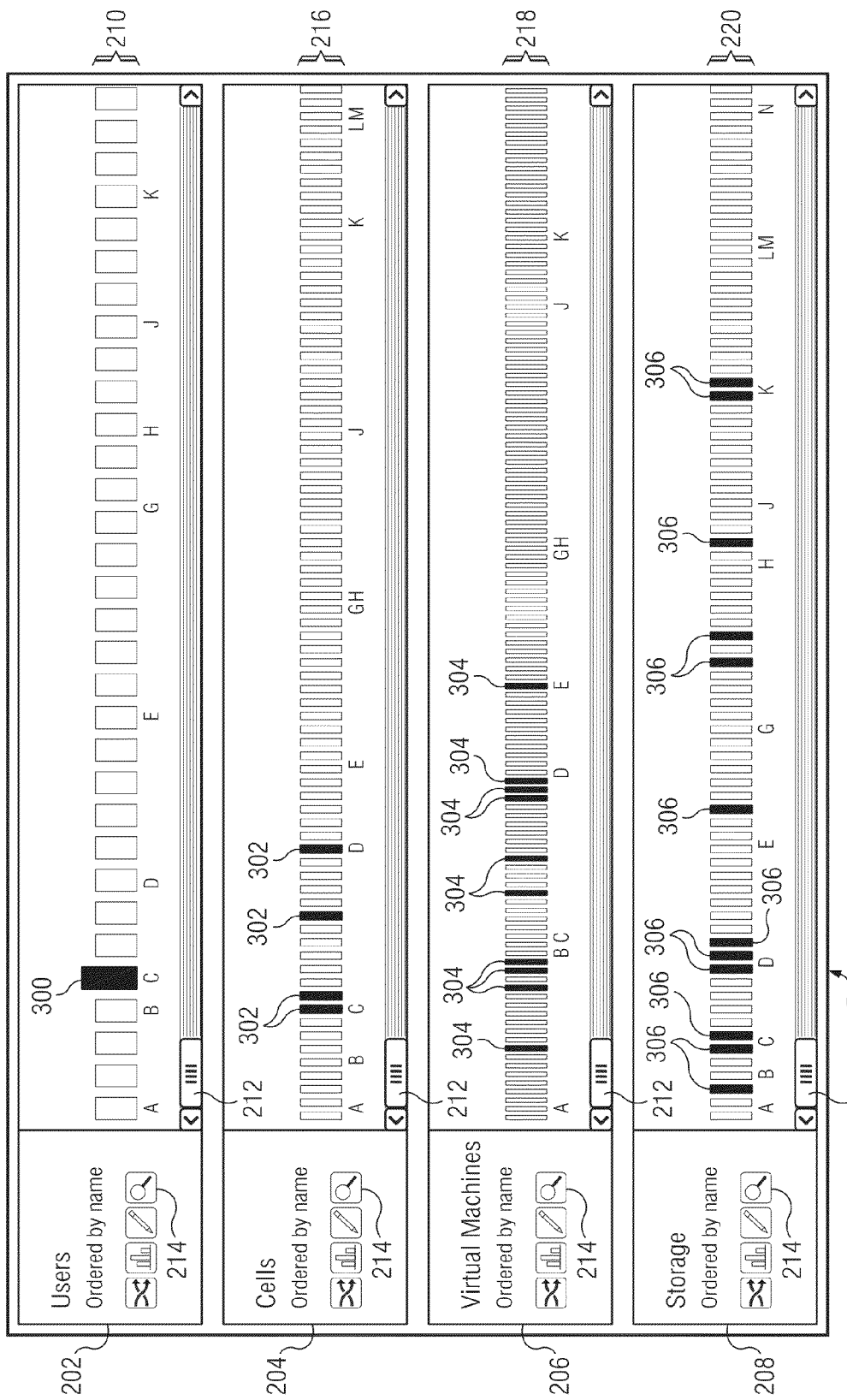

One example of a technique for visually representing relationships between different ones of the objects visually represented within GUI 200 is illustrated in FIG. 3A. As illustrated in FIG. 3A, in response to user selection of rectangle 300 from within the "Users" string 210 representing a particular user of the virtualized infrastructure, the computing device that generates GUI 200 updates GUI 200 to visually identify (i) the graphical representations 302 in "Cells" string 216 of each of the cells created and deployed by the user represented by rectangle 300 in "Users" string 210; (ii) the graphical representations 304 in "Virtual Machines" string 218 of each of the virtual machines included within the cells created and deployed by the user represented by rectangle 300 in "Users" string 210; and (iii) the graphical representations 306 in "Storage" string 320 of each of the virtualized storage resources included within the cells created and deployed by the user represented by rectangle 300 in "Users" string 210. In the particular example illustrated in FIG. 3A, the computing device that generates GUI 200 applies a common shading to rectangle 300 in "Users" string 210 and the graphical representations 302 of each of the cells created and deployed by the user represented by rectangle 300, the graphical representations 304 of each of the virtual machines included within the cells created and deployed by the user represented by rectangle 300 in "Users" string 210, and the graphical representations 306 of each of the virtualized storage resources included within the cells created and deployed by the user represented by rectangle 300 in "Users" string 210 that differentiates each of these shaded graphical representations of related objects from the other graphical representations of objects in GUI 200. However, other techniques for visually representing related objects also may be employed.

Furthermore, in some implementations, GUI 200 may be configured to visually represent other types of relationships. For example, in some implementations, in response to user selection of a particular rectangle in "Cells" string 216 representing a particular cell deployed in a virtualized infrastructure, the computing device that generates GUI 200 may update GUI 200 to visually identify (i) the graphical representation in "Users" string 210 of the user who created the particular cell; (ii) the graphical representations in "Virtual Machines" string 218 of the virtual machines included within the particular cell; and (iii) the graphical representations in "Storage" string 220 of the virtualized storage resources included in the particular cell. Additionally or alternatively, in response to user selection of a particular rectangle in "Virtual Machines" string 218 representing a particular virtual machine deployed in a virtualized infrastructure, the computing device that generates GUI 200 may update GUI 200 to visually identify (i) the graphical representation in the "Cells" string 216 of the cell within which the particular virtual machine is contained; (ii) the graphical representation(s) in the "Storage" string 220 of the virtualized storage resources to which the particular virtual machine is connected; and (iii) the graphical representation in the "Users" string 210 that represents the user who created the cell within which the particular virtual machine is contained. Similarly, in response to user selection of a particular rectangle in "Storage" string 220 representing a particular virtualized storage resource deployed in a virtualized infrastructure, the computing device that generates GUI 200 may update GUI 200 to visually identify (i) the graphical representation in the "Cells" string 216 of the cell within which the particular virtualized storage resource is contained; (ii) the graphical representation(s) in the "Virtual Machines" string 218 of the virtual machines to which the particular virtualized storage resource is connected; and (iii) the graphical representation in the "Users" string 210 that represents the user who created the cell within which the particular virtualized storage resource is contained.

FIG. 3B is a flowchart 350 that illustrates an example of a process for reflecting relationships between different objects within a visual representation of sets of different objects. For example, the process illustrated in the flowchart 350 of FIG. 3B may be performed to reflect relationships between objects within different sets of objects associated with a virtualized infrastructure provided by a cloud computing service and visually represented within a GUI, such as, for example, the GUI 200 illustrated in FIGS. 2A-2D and 3A. Furthermore, the process illustrated in the flowchart 350 may be performed by one or more computing devices such as, for example, one or more of host computing devices 152 of FIG. 1B, one or more of user computing devices 156 of FIG. 1B, or a combination of one or more of host computing devices 152 and one or more of user computing devices 156 of FIG. 1B.

At 352, data is accessed that identifies both (i) sets of objects of different types associated with a computing environment (e.g., two or more of a set of users of a virtualized computing infrastructure, a set of cells instantiated in a virtualized computing infrastructure, a set of virtual machines instantiated in a virtualized computing infrastructure, and a set of virtualized storage resources instantiated in a virtualized computing infrastructure) and (ii) relationships between individual ones of the objects. Then, at 354, a visual representation of the sets of objects is generated that includes parallel, linear rows of graphical representations of the objects of different types. For example, the visual representation may represent each set of instantiated resources of a given type graphically such as "string" of rectangles as in the "Cells" string 210, the "Virtual Machines" string 218, and the "Storage" string 220 illustrated in the GUI 200 of FIGS. 2A-2D and 3A.

At 356, an indication of a selection of a particular one of the graphical representations of the objects is received. For example, referring again to FIG. 3A, an indication of a selection of rectangle 300 within the "Users" string 210 representing a particular user of the virtualized infrastructure 100 may be received. Then, at 358, one or more additional objects from within the different sets of objects are identified as being related to the particular object selected. For example, referring again to FIG. 3A and continuing with the example from above in which rectangle 300 within "Users" string 210 is selected, each of the cells created and deployed by the user represented by rectangle 300 may be identified along with each of the virtual machines included within the cells created and deployed by the user and each of the virtualized storage resources included within the cells created and deployed by the user represented by rectangle 300.

Finally, at 360, a graphical effect is applied to the graphical representation of the particular selected object as well as the graphical representations of the additional objects identified as being related to the particular selected object. For example, referring again to FIG. 3A and continuing with the example from above in which rectangle 300 within "Users" string 210 is selected, a common shading may be applied to rectangle 300 in "Users" string 210 and the graphical representations 302 of each of the cells created and deployed by the user represented by rectangle 300, the graphical representations 304 of each of the virtual machines included within the cells created and deployed by the user represented by rectangle 300 in "Users" string 210, and the graphical representations 306 of each of the virtualized storage resources included within the cells created and deployed by the user represented by rectangle 300 in "Users" string 210.

Referring again to FIG. 1A, changes made to one or more different aspects associated with the virtualized infrastructure 100 provided by the cloud computing service provider may impact other aspects associated with the virtualized infrastructure 100 that are related to those aspects associated with the virtualized infrastructure 100 that are changed. For example, if a registered user account is removed from the cloud service provider, any cells 102 created and deployed by a user associated with the removed account as well as any virtual machines 104 and/or virtualized storage resources 106 included in such cells 102 also may be removed from the virtualized infrastructure 100 as a consequence. Similarly, if a registered user account is added to the cloud service provider, one or more new cells 102, each potentially including one or more new virtual machines 104 and/or one or more new virtualized storage resources 106, may be created and deployed by a user associated with the new user account. Consequently, in some implementations, GUI 200 may be configured to visually reflect changes to certain objects visually represented within GUI 200 that also impact other, related objects that also are visually represented within GUI 200.

Figure 4A:
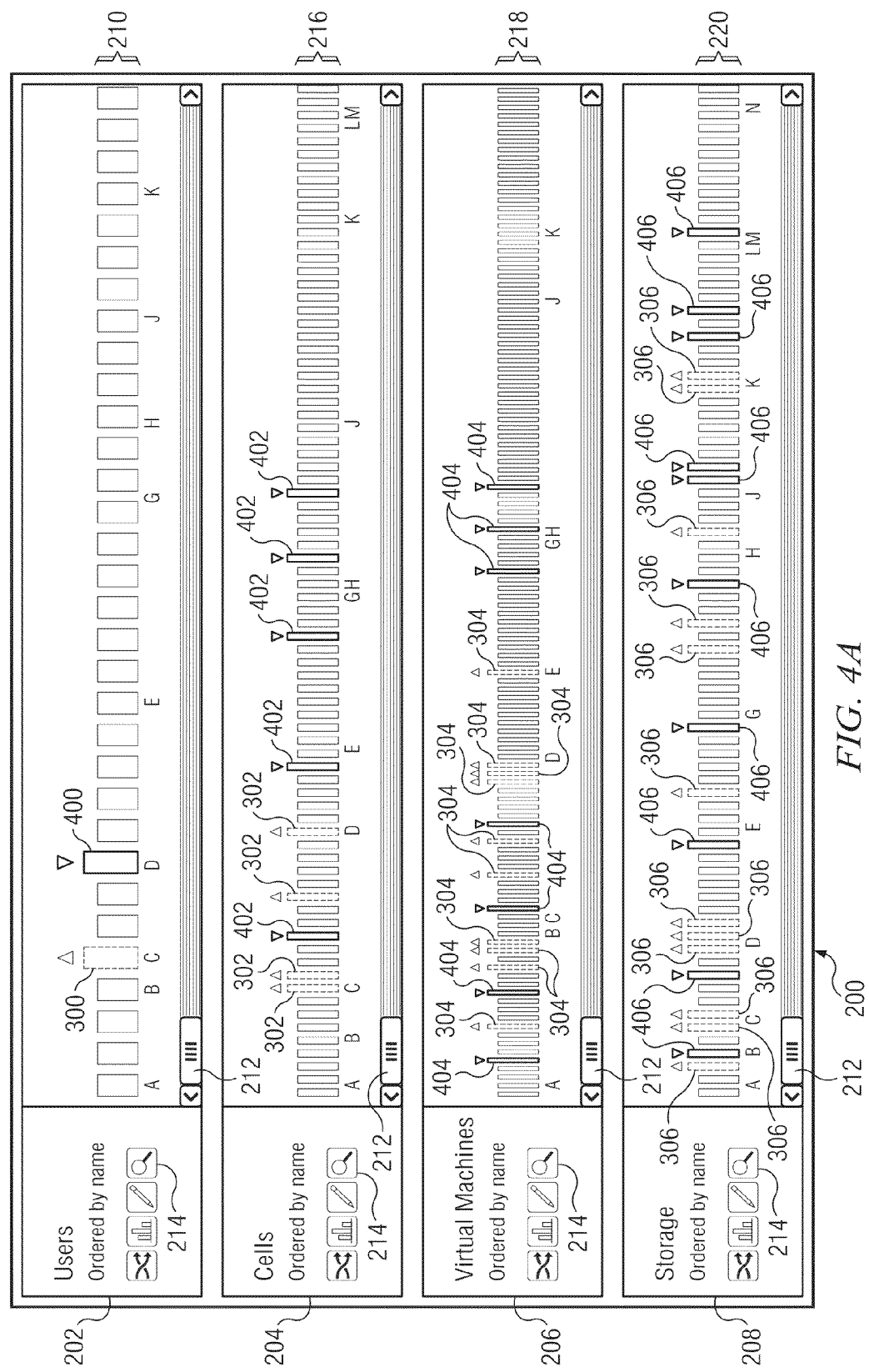

Examples of techniques for visually reflecting changes to certain objects visually represented within GUI 200 that impact other, related objects also visually represented within GUI 200 are illustrated in FIG. 4A.

As illustrated in FIG. 4A, in response to the removal of a particular registered user account from the cloud computing service provider, the computing device that generates GUI 200 updates GUI 200 to visually reflect that the particular user account has been removed by visually differentiating the rectangle 300 in "Users" string 210 representing the particular user account from the other rectangles in "Users" string 210. In the particular example illustrated in FIG. 4A, the computing device generates an upward facing arrow over and applies a different formatting (e.g., dashed line) to the border of the rectangle 300 in "Users" string 210 that represents the particular user account to differentiate the rectangle 300 from the other rectangles in "Users" string 210 and to visually reflect that the user account represented by rectangle 300 in "Users" string 210 has been removed from the cloud computing service provider.

In addition to updating GUI 200 to visually reflect that the user account represented by rectangle 300 in "Users" string 210 has been removed from the cloud computing service provider, the computing device also updates GUI 200 to visually reflect that all of the cells created and deployed on behalf of the removed user account as well as all of the virtual machines and virtualized storage resources included in such cells have been removed from the virtualized infrastructure. In particular, the computing device generates upward facing arrows over and applies the same formatting (e.g., dashed lines) to the borders of the graphical representations 302 of the cells created and deployed on behalf of the removed user account in "Cells" string 216, the graphical representations 304 of the virtual machines in "Virtual Machines" string 218 that were included within the cells created and deployed on behalf of the removed user account, and the graphical representations 306 of the virtualized storage resources in "Storage" string 220 that were included within the cells created and deployed on behalf of the removed user account.

As also illustrated in FIG. 4A, in response to the addition of a new registered user account to the cloud computing service provider, the computing device that generates GUI 200 updates GUI 200 to visually reflect that the new user account has been added by visually differentiating the rectangle 400 in "Users" string 210 that represents the particular user account from the other rectangles in "Users" string 210. In the particular example illustrated in FIG. 4A, the computing device generates a downward facing arrow over and applies a different formatting (e.g., bolded line) to the border of the rectangle 400 in "Users" string 210 that represents the newly added user account to differentiate the rectangle 400 from the other rectangles in "Users" string 210 and to visually reflect that the new user account represented by rectangle 400 in "Users" string 210 has been added to the cloud computing service provider.

In addition to updating GUI 200 to visually reflect that the new user account represented by rectangle 400 in "Users" string 210 has been added to the cloud computing service provider, the computing device also updates GUI 200 to visually reflect that the addition of the new user account has resulted in the creation and deployment of new cells as well as constituent virtual machines and virtualized storage resources on behalf of the new user account. In particular, the computing device generates downward facing arrows over and applies the same formatting (e.g., bolded lines) to the borders of the new graphical representations 402 of the new cells created and deployed on behalf of the new user account in "Cells" string 216, the new graphical representations 404 of the new virtual machines in "Virtual Machines" string 218 that were included within the new cells created and deployed on behalf of the new user account, and the new graphical representations 406 of the new virtualized storage resources in "Storage" string 220 that were included within the new cells created and deployed on behalf of the new user account.

Figures 4B, 5E:
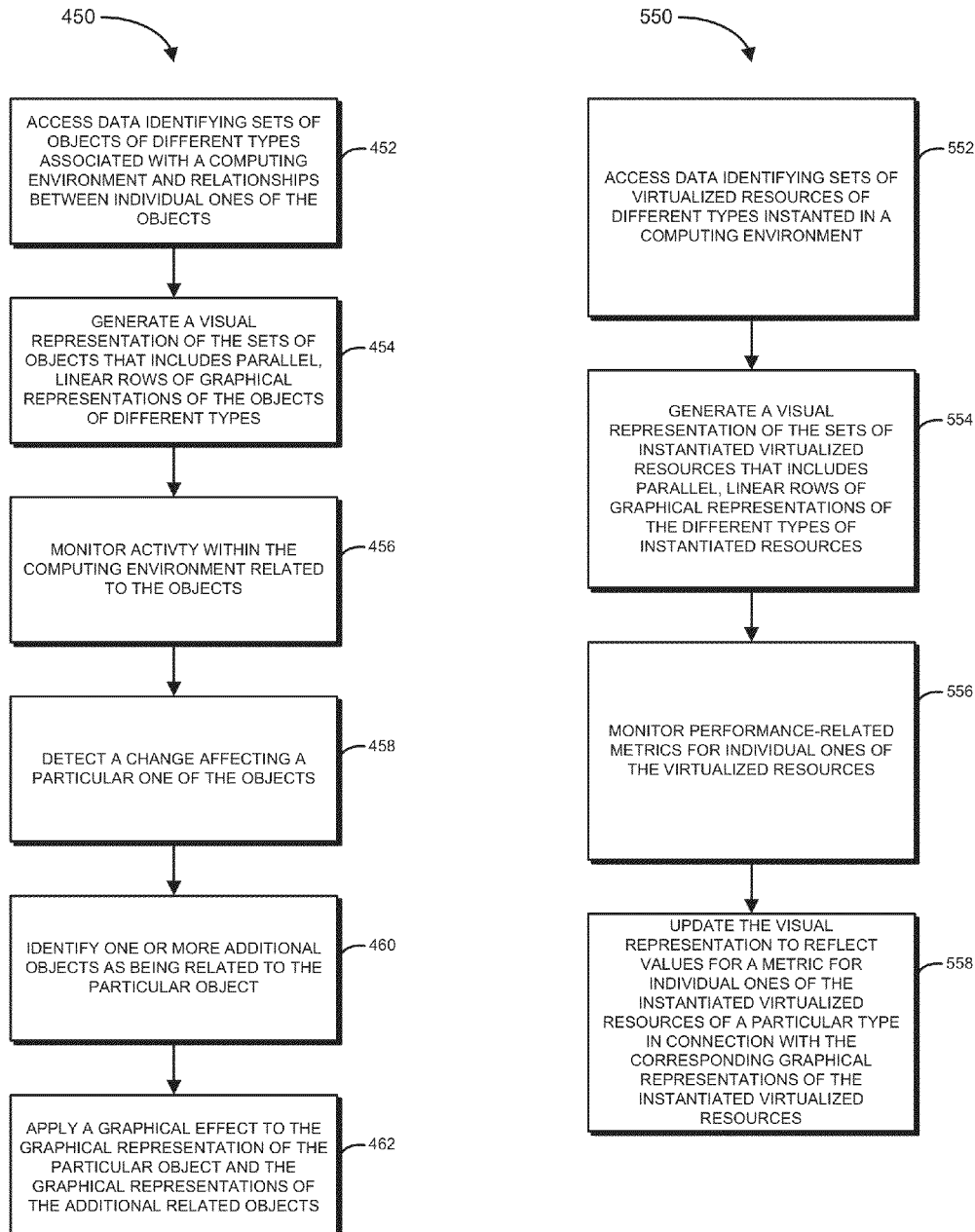
FIG. 4B is a flowchart that illustrates an example of a process for reflecting changes that affect related objects within a visual representation of sets of different objects.
FIG. 5E is a flowchart that illustrates an example of a process for reflecting values for a metric in a display of a visual representation of sets of instantiated resources.

FIG. 4B is a flowchart 450 that illustrates an example of a process for reflecting changes that affect related objects within a visual representation of sets of different objects. For example, the process illustrated in the flowchart 450 of FIG. 4B may be performed to visually reflect a change to an object associated with a virtualized infrastructure provided by a cloud computing service provider that affects other, related objects associated with the virtualized infrastructure provided by the cloud computing service provider within a GUI that visually represents different sets of objects associated with the virtualized infrastructure provided by the cloud computing service provider, such as, for example, the GUI 200 illustrated in FIGS. 2A-2D, 3A, and 4A. Furthermore, the process illustrated in the flowchart 450 may be performed by one or more computing devices such as, for example, one or more of host computing devices 152 of FIG. 1B, one or more of user computing devices 156 of FIG. 1B, or a combination of one or more of host computing devices 152 and one or more of user computing devices 156 of FIG. 1B.

At 452, data is accessed that identifies (i) sets of objects of different types associated with a computing environment (e.g., two or more of a set of users of a virtualized computing infrastructure, a set of cells instantiated in a virtualized computing infrastructure, a set of virtual machines instantiated in a virtualized computing infrastructure, and a set of virtualized storage resources instantiated in a virtualized computing infrastructure) as well as (ii) relationships between individual ones of the objects. Then, at 454, a visual representation of the sets of objects is generated that includes parallel, linear rows of graphical representations of the objects of different types. For example, the visual representation may represent each set of instantiated resources of a given type graphically as a "string" of rectangles such as the "Cells" string 210, the "Virtual Machines" string 218, and the "Storage" string 220 illustrated in the GUI 200 of FIGS. 2A-2D, 3A, and 4A.

At 456, activity within the computing environment related to the different objects is monitored. For example, among other activity, the users using a virtualized computing infrastructure may be monitored. At 458, as a consequence of monitoring activity within the computing environment, a change affecting a particular one of the objects is detected.

For example, the removal of a user of a virtualized computing infrastructure may be detected. Then, at 460, after having detected the change affecting the particular object, one or more additional objects are identified as being related to the particular object. For example, if the change affecting an object that is detected at 458 is the removal of a user of a virtualized computing infrastructure, the one or more additional objects identified at 460 as being related to the particular object may be cells the user created and deployed on the virtualized computing infrastructure and any virtual machines and/or virtualized storage resources included within those cells created and deployed on the virtualized computing infrastructure by the user.

Finally, at 462, a graphical effect is applied to the graphical representation of the particular object and the graphical representations of the additional objects identified as being related to the particular object. For example, referring again to FIG. 4A, if the change affecting an object that is detected at 458 is the removal of a user of a virtualized computing infrastructure and the one or more additional objects identified at 460 as being related to the particular object are cells the user created and deployed on the virtualized computing infrastructure and any virtual machines and/or virtualized storage resources included within those cells, a graphical effect may be applied to the graphical representation of the removed user 300 as well the graphical representations 302 of the cells deployed by the removed user and the graphical representations 304 and 306 of the virtual machines and virtualized storage resources included within those cells reflecting that the user, the cells, the virtual machines, and the virtualized storage resources all have been removed from the virtualized computing infrastructure. In the particular example illustrated in FIG. 4A, an upward facing arrow and a dashed line border are applied to the graphical representations of the removed user 300, cells 302, virtual machines 304, and virtualized storage resources 306 to reflect their removal from the virtualized computing infrastructure.

Referring again to FIG. 1A, metrics related to the operational performance of virtualized infrastructure 100 and/or resources deployed within virtualized infrastructure 100 may be measured and recorded. For example, the physical memory utilization and/or the physical central processing unit (CPU) utilization by the different virtual machines 104 deployed within the virtualized infrastructure 100 may be measured and recorded. Additionally or alternatively, the free space remaining within the different virtualized storage resources 106 and/or the input/output (I/O) operations per second for the different virtualized storage resources 106 may be measured and recorded. Similarly, the throughput of the different virtual network connections (e.g., packets in/packets out) may be measured and recorded. In some implementations, GUI 200 may be configured to display values for any of these or a variety of other metrics related to the operational performance of virtualized infrastructure 100 that may be measured and recorded.

Examples of techniques for displaying visual representations of values for metrics related to the operational performance of virtualized infrastructure 100 within GUI 200 are illustrated in FIGS. 5A-5D.

Figure 5A:
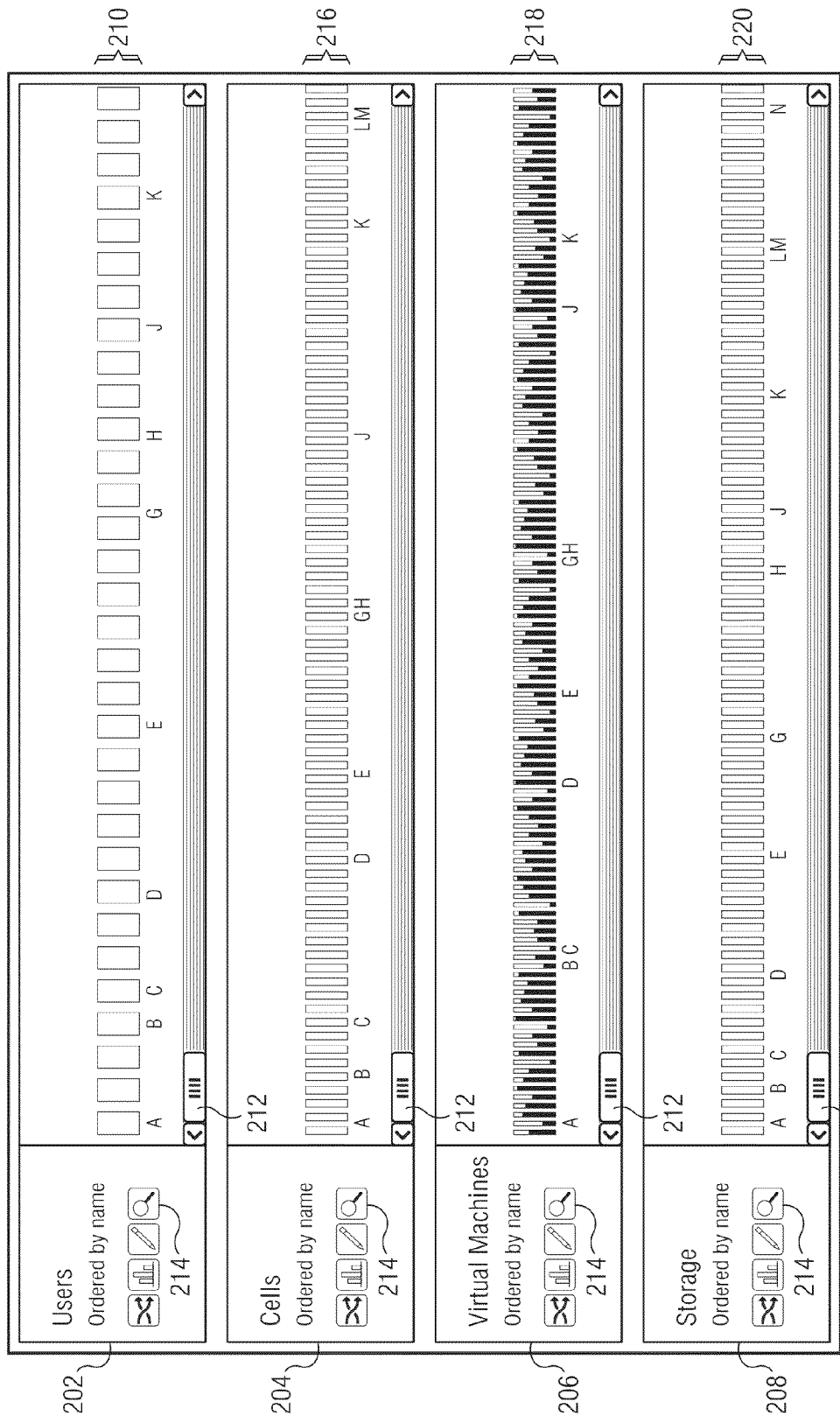

Reference is made first to FIG. 5A, in which an example of a technique for visually representing values for a metric related to the operational performance of the virtual machines deployed in virtualized infrastructure is illustrated. Depending on the implementation, the metric related to the operational performance of the virtual machines may be the physical memory utilization by the different virtual machines, the CPU utilization by the different virtual machines, or a variety of other metrics related to the operational performance of the virtual machines.

As illustrated in FIG. 5A, values for the metric related to the operational performance of the different virtual machines are represented visually by plotting histogram-like bars within the rectangular representations of the virtual machines in the "Virtual Machines" string 218. For example, if the metric related to the operational performance of the different virtual machines that is being represented visually in GUI 200 is the physical memory utilization by the different virtual machines, the rectangular representations of those virtual machines that are utilizing relatively large quantities of physical memory will be overlaid with relatively large/tall histogram-like bars while the rectangular representations of those virtual machines that are utilizing relatively small quantities of physical memory will be overlaid with relatively small/short histogram-like bars. Of course, the same technique also may be used to visually reflect values for a variety of other metrics related to the operational performance of the virtual machines including physical CPU utilization. Similarly, the same technique may be applied to visually reflect values for metrics related to the operational performance of other resources within a virtualized infrastructure including, for example, the free space remaining within virtualized storage resources, I/O operations per second for virtualized storage resources, and the throughput of different virtual network connections.

Figure 5B:
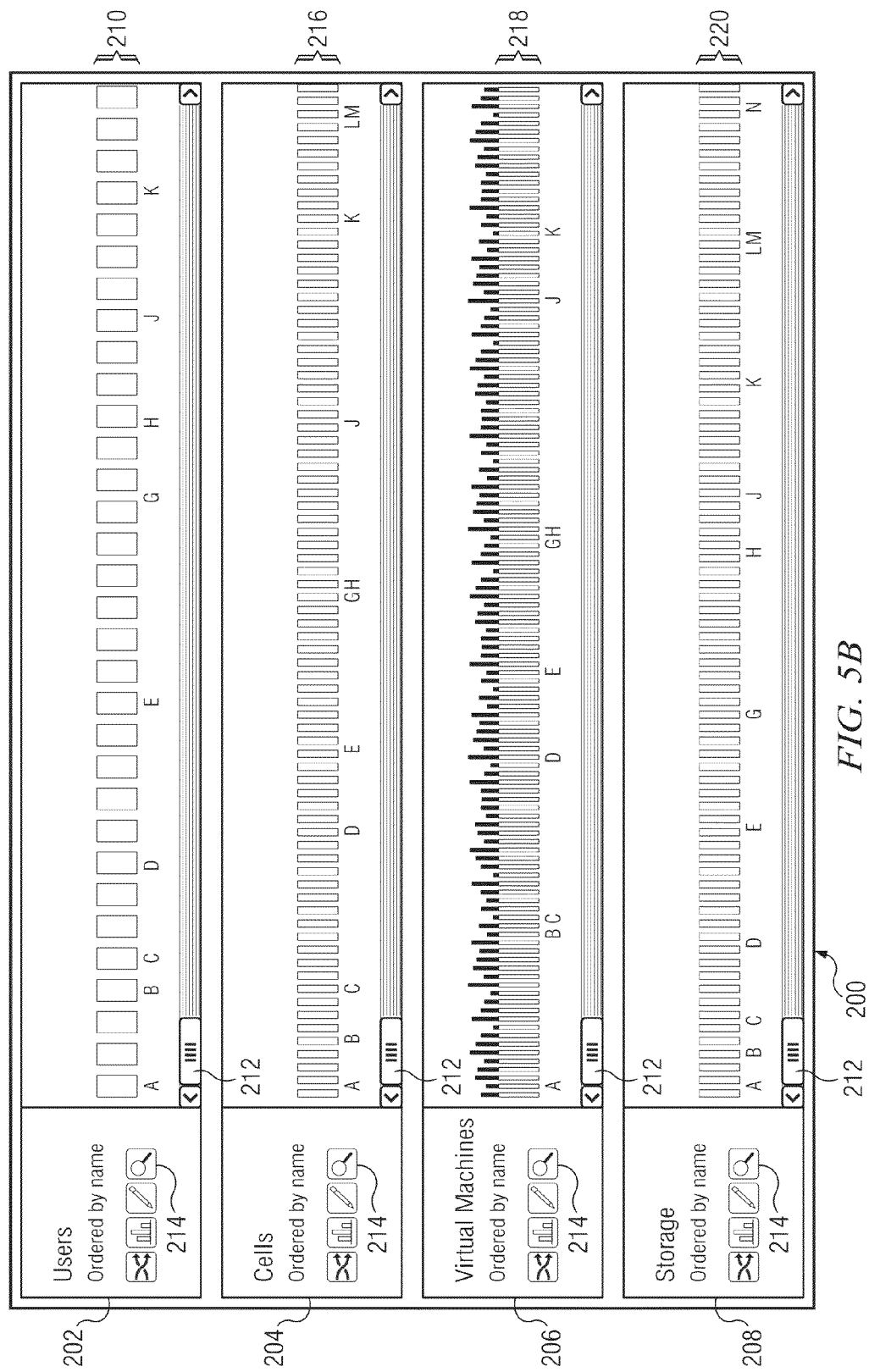

A variety of other techniques also may be employed to visually represent values for these same and other metrics related to the operational performance of a virtualized infrastructure within GUI 200. FIG. 5B illustrates a second such technique, again in the context of a metric related to the operational performance of the virtual machines. In FIG. 5B, values for the metric related to the operational performance of the different virtual machines again are represented visually by plotting histogram-like bars in connection with the rectangular representations of the virtual machines in the "Virtual Machines" string 218. This time, however, in contrast to FIG. 5A, the histogram-like bars are plotted over the corresponding rectangular representations of the virtual machines instead of inside of the rectangular representations of the virtual machines. Here again, this technique could be used to visually represent values for a variety of different metrics related to the operational performance of the virtual machines including, for example, the physical memory utilization by the different virtual machines or the CPU utilization by the different virtual machines. Similarly, this same technique also could be used to visually represent values for a variety of different metrics related to the operational performance of other resources within a virtualized infrastructure including, for example, the free space remaining within virtualized storage resources, I/O operations per second for virtualized storage resources, and the throughput of different virtual network connections.

Figure 5C:
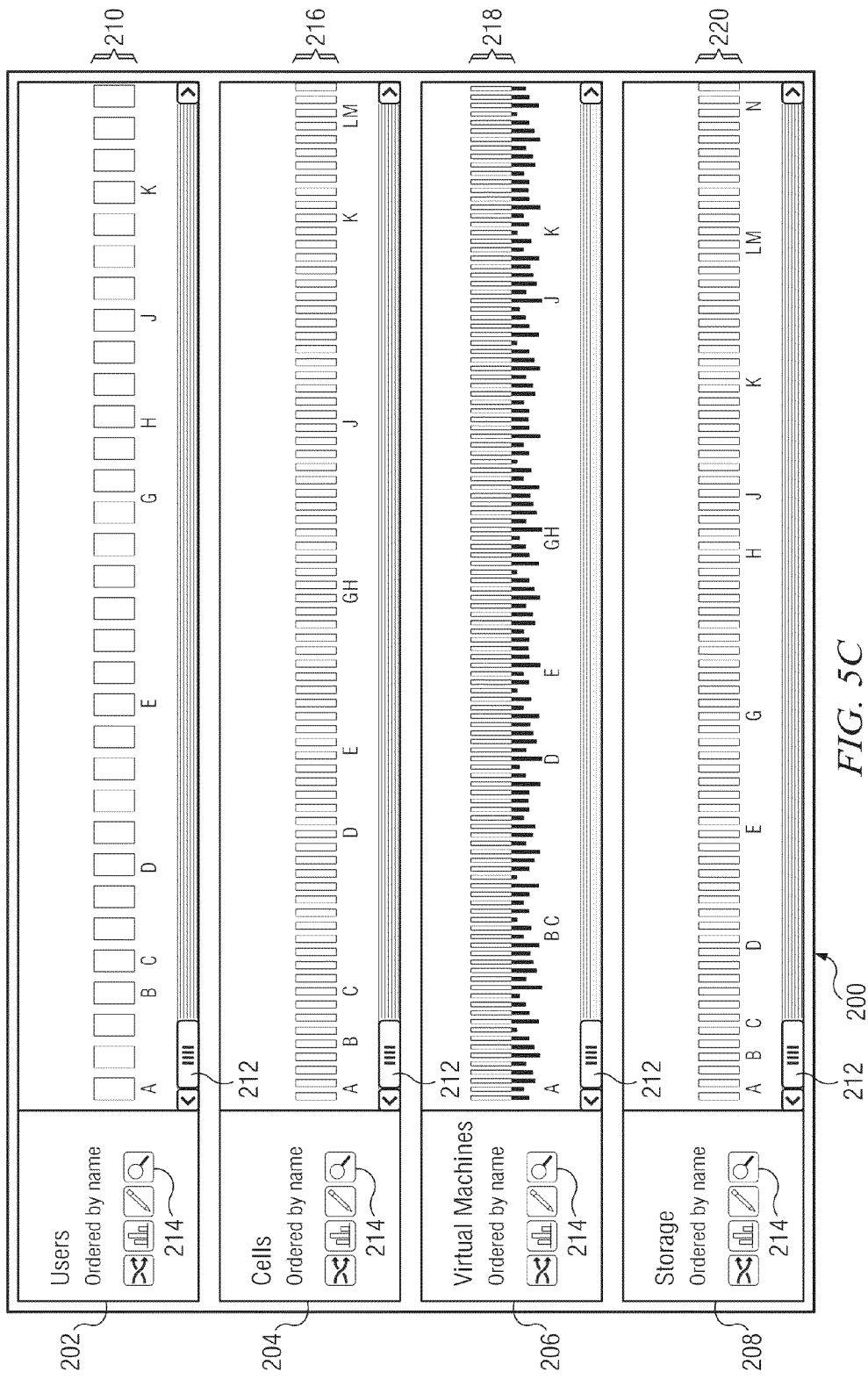

FIG. 5C illustrates a third technique for visually representing values for a metric related to the operational performance of resources deployed in a virtualized infrastructure within GUI 200, again in the context of a metric related to the operational performance of the virtual machines. In FIG. 5C, the values for the metric related to the operational performance of the different virtual machines again are represented visually by plotting histogram-like bars in connection with the rectangular representations of the virtual machines in the "Virtual Machines" string 218. This time, however, in contrast to FIGS. 5A and 5B, the histogram-like bars are plotted below the corresponding rectangular representations of the virtual machines instead of inside of or over the rectangular representations of the virtual machines. Here again, this technique could be used to visually represent values for a variety of different metrics related to the operational performance of the virtual machines including, for example, the physical memory utilization by the different virtual machines or the CPU utilization by the different virtual machines. Similarly, this same technique also could be used to visually represent values for a variety of different metrics related to the operational performance of other resources within a virtualized infrastructure including, for example, the free space remaining within virtualized storage resources, I/O operations per second for virtualized storage resources, and the throughput of different virtual network connections.

Figure 5D:
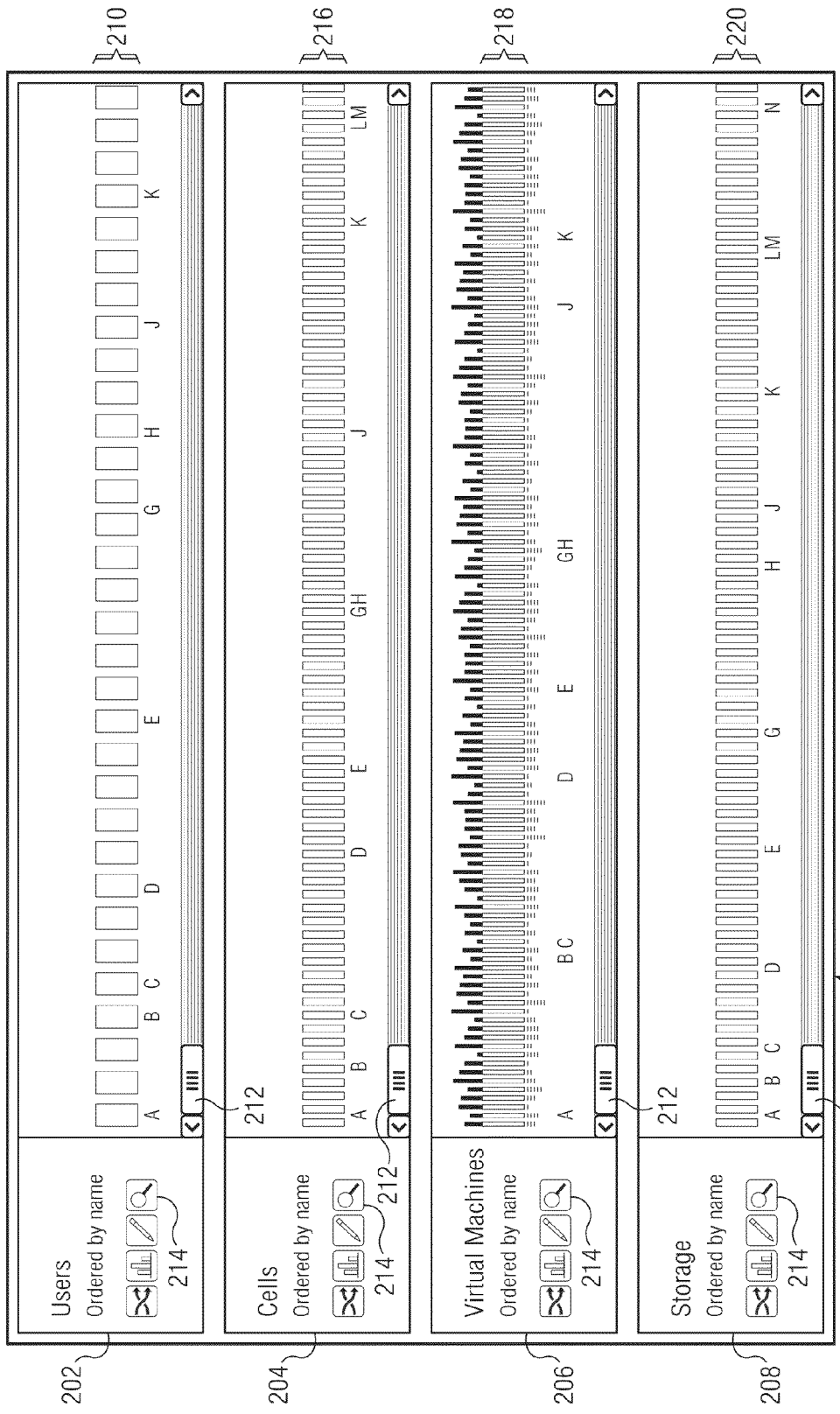

In some implementations, GUI 200 may be configured to visually represent values for two different metrics related to the operational performance of a particular resource type deployed within a virtualized infrastructure concurrently. FIG. 5D illustrates one example of a technique for visually representing values for two metrics related to the operational performance of a particular resource type deployed in a virtualized infrastructure within GUI 200, again in the context of metrics related to the operational performance of virtual machines. As illustrated in FIG. 5D, values for a first metric related to the operational performance of the different virtual machines (e.g., physical memory utilization) are represented visually by plotting histogram-like bars that represent individual values for the metric over the rectangular representations of the virtual machines in the "Virtual Machines" string 218 to which the individual values correspond. Similarly, values for a second metric related to the operational performance of the different virtual machines (e.g., CPU utilization) are represented visually by plotting histogram-like bars that represent individual values for the metric below the rectangular representations of the virtual machines in the "Virtual Machines" string 218 to which the individual values correspond. This same technique could be used to visually represent values for a variety of different pairs of metrics related to the operational performance of a resource of a given type within a virtualized infrastructure concurrently including, for example, the free space remaining within virtualized storage resources at the same time as I/O operations per second for the virtualized storage resources.

FIG. 5E is a flowchart 550 that illustrates an example of a process for reflecting values for a metric in a display of a visual representation of sets of instantiated resources. For example, the process illustrated in the flowchart 550 of FIG. 5E may be performed to visually reflect values for a metric related to the operational performance of a particular resource type instantiated within a virtualized infrastructure provided by a cloud computing service provider within a GUI that visually represents different sets of resources instantiated within the virtualized infrastructure provided by the cloud computing service provider, such as, for example, the GUI 200 illustrated in FIGS. 2A-2D, 3A, 4A, and 5A-5D. Furthermore, the process illustrated in the flowchart 550 may be performed by one or more computing devices such as, for example, one or more of host computing devices 152 of FIG. 1B, one or more of user computing devices 156 of FIG. 1B, or a combination of one or more of host computing devices 152 and one or more of user computing devices 156 of FIG. 1B.

At 552, data is accessed that identifies sets of virtualized resources of different types instantiated in a computing environment (e.g., two or more of a set of cells instantiated in a virtualized computing infrastructure, a set of virtual machines instantiated in a virtualized computing infrastructure, and a set of virtualized storage resources instantiated in a virtualized computing infrastructure). Then, at 554, a visual representation is generated of the sets of instantiated virtualized resources that includes parallel, linear rows of graphical representations of the different types of instantiated resources. For example, the visual representation may represent each set of instantiated resources of a given type graphically as a "string" of rectangles such as the "Cells" string 210, the "Virtual Machines" string 218, and the "Storage" string 220 illustrated in the GUI 200 of FIGS. 2A-2D, 3A, 4A, and 5A-5D.

At 556, performance-related metrics are monitored for individual ones of the virtualized resources. For example, among other metrics, physical memory utilization and/or CPU utilization may be monitored for individual virtual machines, free space remaining and/or I/O operations per second may be monitored for virtualized storage resources, and throughput may be monitored for virtual network connections. Then, at 558, the visual representation is updated to reflect values for a metric for individual ones of the instantiated virtualized resources of a particular type in connection with the corresponding graphical representations of the instantiated virtualized resources. For example, the values for the metric for the individual ones of the instantiated resources of the particular type may be reflected visually by employing the techniques illustrated and described above in connection with FIGS. 5A-5D.

Although the discussion above in connection with FIGS. 5A-5E focuses generally on techniques for displaying visual representations of values for dynamic metrics related to the operational performance of a virtualized infrastructure, similar techniques may be employed to generate visual representations of values of more static attributes of different resources associated with a virtualized infrastructure in addition to or as an alternative to displaying visual representations of values for dynamic metrics as described above. For example, the techniques described above in connection with FIGS. 5A-5E may be used to display visual representations of the number of CPUs allocated to each virtual machine instantiated in the virtualized infrastructure and/or the size of each virtualized storage resource instantiated in the virtualized infrastructure.

As discussed above in connection with FIG. 2A, the graphical representations of individual users in "Users" string 210 may be arranged in alphabetical order according to names assigned to the users, the graphical representations of cells in "Cells" string 216 may be arranged in alphabetical order according to names assigned to the cells, the graphical representations of virtual machines in "Virtual Machines" string 218 may be arranged in alphabetical order according to names assigned to the virtual machines, and the graphical representations of virtualized storage resources in "Storage" string 220 may be arranged in alphabetical order according to names assigned to the virtualized storage resources. However, the graphical representations in each of these strings also may be ordered according to other criteria.

Figure 6:
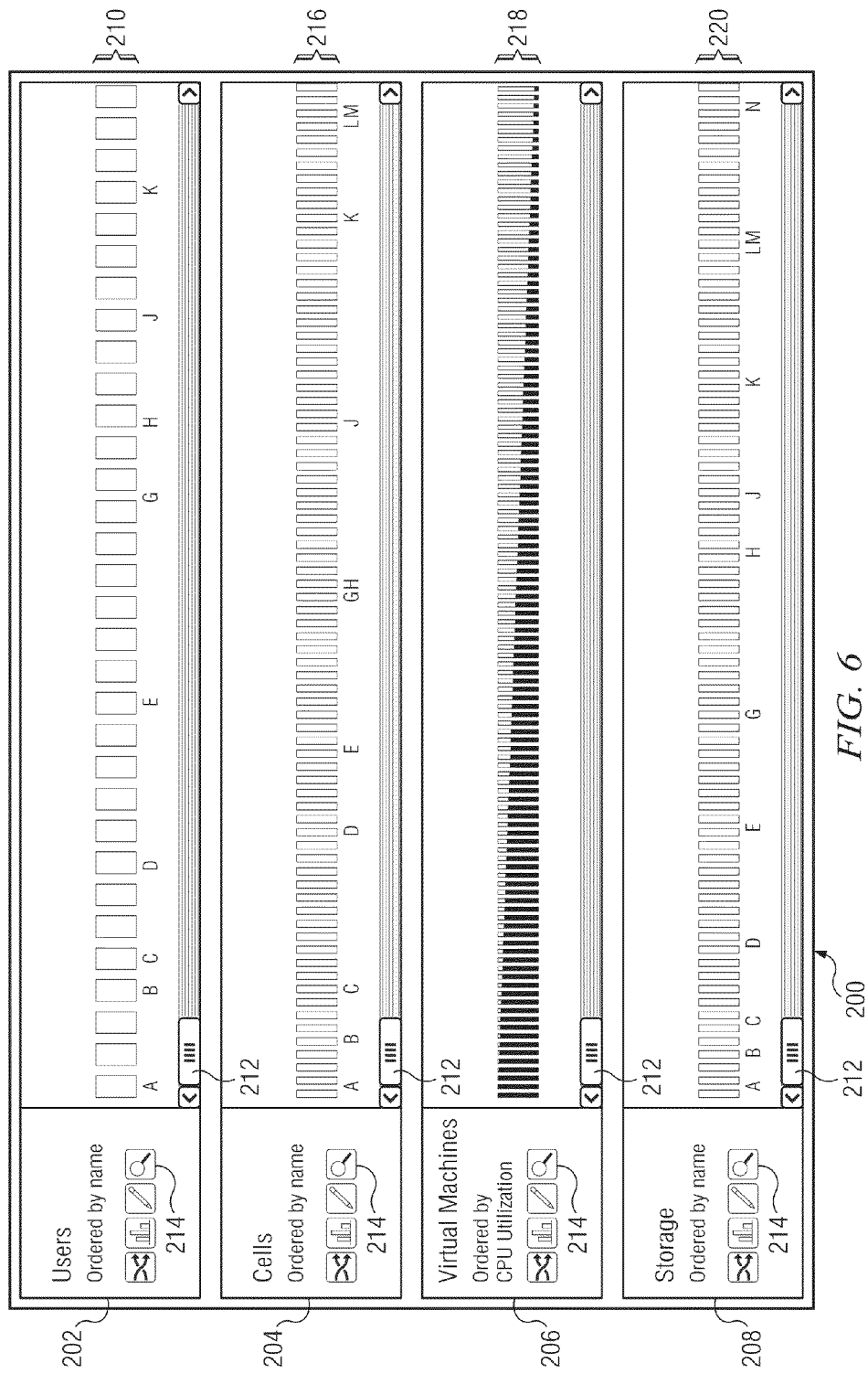

For example, in implementations in which metrics related to the operational performance of resources instantiated in a virtualized infrastructure are measured and recorded, the graphical representations of the cells in "Cells" string 216, the graphical representations of virtual machines in "Virtual Machines" string 218, and/or the graphical representations of virtualized storage resources in "Storage" string 220 may be ordered according to their values for one or more different metrics related to the operational performance of the resources they represent. In one particular example, referring to FIG. 6, the graphical representations of the virtual machines in "Virtual Machines" string 218 are arranged from left to right in order of highest CPU utilization to lowest CPU utilization. Of course, the graphical representations of the virtual machines in "Virtual Machines" string 218 also could be arranged according to values for other metrics related to their operational performance, including, for example, physical memory utilization. Similarly, the graphical representations of virtualized storage resources in "Storage" string 220 also could be arranged according to values for metrics related to their operational performance including, for example, free space remaining and/or I/O operations per second.

The ability to sort the graphical representations of resources instantiated in a virtualized infrastructure according to values for metrics related to the operational performance of the resources may facilitate the identification of constrained or otherwise overburdened resources by a user of the virtualized infrastructure, thereby potentially enabling the user to make adjustments to improve the operational performance of the impacted resources, services or applications being hosted on or relying upon the impacted resources, or the overall virtualized infrastructure as a whole.

A number of methods, techniques, systems, and apparatuses have been described. However, additional implementations are contemplated. For example, although the techniques for generating visual representations of multiple objects of different data types disclosed herein have been described generally in the context of objects associated with a virtualized computing infrastructure provided by a cloud service provider, the techniques for generating visual representations of multiple objects of different data types disclosed herein may be employed to generate visual representations of multiple objects of any different data type. In fact, in some implementations, these techniques may be employed to generate visual representations of the physical components used to implement a virtualized computing infrastructure provided by a cloud computing service provider in addition to or as an alternative to visual representations of objects associated with the virtualized computing infrastructure itself. In some such implementations, a GUI similar to GUI 200 intended to facilitate the monitoring and management of different aspects of a cloud computing service may include, among other features, a "string" of graphical representations of virtual machines instantiated in a virtualized computing infrastructure and another "string" of graphical representations of the physical host computing devices on which the virtual machines are implemented. In such implementations, selection of a graphical representation of a particular host computing device from within the host computing devices "string" may cause the GUI to identify which virtual machines graphically represented in the virtual machines "string" are hosted on the host computing device that corresponds to the graphical representation of the host computing device selected from within the host computing devices "string" or vice versa. Similarly, a GUI similar to GUI 200 intended to facilitate the monitoring and management of different aspects of a cloud computing service may include, among other features, a "string" of graphical representations of virtualized storage resources instantiated in a virtualized computing infrastructure and another "string" of graphical representations of physical storage resources on which the virtualized storage resources are implemented. In such implementations, selection of a graphical representation of a particular physical storage resource from within the physical storage "string" may cause the GUI to identify which virtualized storage resources graphically represented in the virtualized storage "string" are implemented on the physical storage resource that corresponds to the graphical representation of the physical storage resource selected from within the physical storage "string" or vice versa. Providing such visual representations of both virtualized resources and the physical hardware on which they are implemented may assist a user in identifying and diagnosing hardware failure and understanding its impact. Furthermore, these techniques may be employed in the context of a relational database storing business information to generate, for instance, visual representations of the business' customers, products or services sold by the business, orders received by the business, and relationships between any of the business' customers, the products or services sold by the business, and the orders received by the business. In addition, although the disclosed "strings" of graphical representations of objects of the same data type generally are described and illustrated herein as being oriented horizontally, they could be oriented differently (e.g., vertically).

Moreover, although the disclosed graphical representations of objects of the same data type comprising any such "string" generally are described and illustrated herein as being equally-sized rectangles, the graphical representations of objects of the same data type comprising any particular string need not by equally-sized nor need they be rectangular. Instead, the graphical representations of objects may take a variety of different shapes. In addition, although examples are disclosed herein of specific graphical effects that may be applied to differentiate individual graphical representations of objects within "strings" from other graphical representations of objects within "strings" (e.g., different shading, different border formats, different sizes, etc.), a variety of other effects may be applied to differentiate individual graphical representations of objects in addition or as an alternative to the examples specifically disclosed herein. For example, different color schemes, different shading techniques, different border formats, different dynamic effects (e.g., flashing), etc. may be applied to differentiate individual graphical representations of objects.

The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved.

Similarly, components in the disclosed systems may be combined in a different manner and/or replaced or supplemented by other components and the desired results still may be achieved.

What is claimed is:

1. A non-transitory computer-readable storage medium storing instructions that, when executed by a computing system, cause the computing system to:
 access data identifying a set of virtualized resources instantiated in a computing environment;
 display a visual representation of the set of instantiated virtualized resources that includes a horizontal linear row of graphical representations of individual ones of the set of instantiated virtualized resources;
 monitor a performance-related metric for the individual ones of the set of instantiated virtualized resources;
 reflect values for the performance-related metric in connection with the corresponding graphical representations;
 plot the values as bars of a histogram positioned above the horizontal linear row of the graphical representations of the visual representation as a plotted visual representation, wherein each bar of the histogram is positioned above one of the graphical representations and represents a value of the performance-related metric; and
 display the plotted visual representation of the plotted values to a display device.

2. The non-transitory computer-readable storage medium of claim 1 wherein the instructions that, when executed by the computing system, cause the computing system to:
 access data identifying a set of virtual machines instantiated in a computing environment;
 display a visual representation of the set of instantiated virtual machines that includes a horizontal linear row of graphical representations of individual ones of the set of virtual machines;
 monitor CPU usage by individual ones of the instantiated virtual machines; and
 reflect CPU usage values in connection with the corresponding graphical representations of the individual instantiated virtual machines.

3. The non-transitory computer-readable storage medium of claim 1 wherein the instructions that, when executed by the computing system, cause the computing system to:
 access data identifying a set of virtual machines instantiated in a computing environment;
 display a visual representation of the set of instantiated virtual machines that includes a horizontal linear row of graphical representations of individual ones of the set of virtual machines;
 monitor memory usage by individual ones of the instantiated virtual machines; and
 reflect memory usage values in connection with the corresponding graphical representations of the individual instantiated virtual machines.

4. The non-transitory computer-readable storage medium of claim 1 wherein the instructions that, when executed by the computing system, cause the computing system to:
 access data identifying a set of virtualized storage resources instantiated in a computing environment;
 display a visual representation of the set of instantiated virtualized storage resources that includes a horizontal linear row of graphical representations of individual ones of the set of virtualized storage resources;
 monitor free space remaining for individual ones of the instantiated virtualized storage resources; and
 reflect free space remaining values in connection with the corresponding graphical representations of the individual instantiated virtualized storage resources.

5. The non-transitory computer-readable storage medium of claim 1 wherein the instructions that, when executed by the computing system, cause the computing system to:
 access data identifying a set of virtual networks instantiated in a computing environment;
 display a visual representation of the set of instantiated virtual networks that includes a horizontal linear row of graphical representations of individual ones of the set of virtual networks;
 monitor throughput on individual ones of the instantiated virtual networks; and
 reflect throughput values in connection with the corresponding graphical representations of the individual instantiated virtual networks.

6. A non-transitory computer-readable storage medium storing instructions that, when executed by a computer, cause the computer to:
 access data identifying a set of virtualized resources instantiated in a computing environment;
 display on a visual representation of the set of instantiated virtualized resources that includes a horizontal linear row of rectangular representations of individual ones of the set of instantiated virtualized resources;
 monitor a performance-related metric for the individual ones of the set of instantiated virtualized resources;
 reflect values for the performance-related metric in connection with the corresponding rectangular representations;
 plot the values as bars of a histogram positioned below the horizontal linear row of rectangular representations of the visual representation as a plotted visual representation, wherein each bar of the histogram is positioned below one of the rectangular representations and represents a value of the performance-related metric; and
 display the plotted visual representation of the plotted values to a display device.

7. The non-transitory computer-readable storage medium of claim 6 wherein the instructions that, when executed by a computer, cause the computer to arrange the horizontal linear row of rectangular representations as equally-sized rectangular representations such that lengths of the equally-sized rectangular representations are perpendicular to the horizontal linear row and widths of the equally-sized rectangular representations are parallel to the horizontal linear row.

8. The non-transitory computer-readable storage medium of claim 6 wherein the instructions that, when executed by the computing system, cause the computing system to:
 access data identifying a set of virtual machines instantiated in a computing environment;
 display a visual representation of the set of instantiated virtual machines that includes a horizontal linear row of rectangular representations of individual ones of the set of virtual machines;
 monitor CPU usage by individual ones of the instantiated virtual machines; and
 reflect CPU usage values in connection with the corresponding rectangular representations of the individual instantiated virtual machines.

9. The non-transitory computer-readable storage medium of claim 6 wherein the instructions that, when executed by the computing system, cause the computing system to:
 access data identifying a set of virtual machines instantiated in a computing environment;

display a visual representation of the set of instantiated virtual machines that includes a horizontal linear row of rectangular representations of individual ones of the set of virtual machines;

monitor memory usage by individual ones of the instantiated virtual machines; and reflect memory usage values in connection with the corresponding rectangular representations of the individual instantiated virtual machines.

10. The non-transitory computer-readable storage medium of claim 6 wherein the instructions that, when executed by the computing system, cause the computing system to:

access data identifying a set of virtualized storage resources instantiated in a computing environment;

display a visual representation of the set of instantiated virtualized storage resources that includes a horizontal linear row of rectangular representations of individual ones of the set of virtualized storage resources;

monitor free space remaining for individual ones of the instantiated virtualized storage resources; and reflect free space remaining values in connection with the corresponding rectangular representations of the individual instantiated virtualized storage resources.

11. The non-transitory computer-readable storage medium of claim 6 wherein the instructions that, when executed by the computing system, cause the computing system to:

access data identifying a set of virtual networks instantiated in a computing environment;

display a visual representation of the set of instantiated virtual networks that includes a horizontal linear row of rectangular representations of individual ones of the set of virtual networks;

monitor throughput on individual ones of the instantiated virtual networks; and reflect throughput values in connection with the corresponding rectangular representations of the individual instantiated virtual networks.

12. A computer-implemented method comprising:

accessing data identifying a set of virtualized resources instantiated in a computing environment;

displaying a visual representation of the set of instantiated virtualized resources that includes a horizontal linear row of rectangular representations of individual ones of the set of instantiated virtualized resources;

monitories a performance-related metric for the individual ones of the set of instantiated virtualized resources;

reflect values for the performance-related metric in connection with the rectangular representations; and plotting values as bars of a histogram positioned above the horizontal linear row of rectangular representations of the visual representation as a plotted visual representation, wherein each bar of the histogram is positioned above one of the rectangular representations and represents a value of the performance-related metric; and display the plotted visual representation of the plotted values to a display device.

13. The computer-implemented method of claim 12 comprising arranging the horizontal linear row of rectangular representations as equally-sized rectangular representations such that lengths of the equally-sized rectangular representations are perpendicular to the horizontal linear row and widths of the equally-sized rectangular representations are parallel to the horizontal linear row.

14. The computer-implemented method of claim 12 comprising:

accessing data identifying a set of virtual machines instantiated in a computing environment;

displaying a visual representation of the set of instantiated virtual machines that includes a horizontal linear row of rectangular representations of individual ones of the set of virtual machines;

monitoring CPU usage by individual ones of the instantiated virtual machines; and reflecting CPU usage values in connection with the corresponding rectangular representations of the individual instantiated virtual machines.

15. The computer-implemented method of claim 12 comprising:

accessing data identifying a set of virtual machines instantiated in a computing environment;

displaying a visual representation of the set of instantiated virtual machines that includes a horizontal linear row of rectangular representations of individual ones of the set of virtual machines;

monitoring memory usage by individual ones of the instantiated virtual machines; and reflecting memory usage values in connection with the corresponding rectangular representations of the individual instantiated virtual machines.

16. The computer-implemented method of claim 12 comprising:

accessing data identifying a set of virtualized storage resources instantiated in a computing environment;

displaying a visual representation of the set of instantiated virtualized storage resources that includes a horizontal linear row of rectangular representations of individual ones of the set of virtualized storage resources;

monitoring free space remaining for individual ones of the instantiated virtualized storage resources; and reflecting free space remaining values in connection with the corresponding rectangular representations of the individual instantiated virtualized storage resources.

17. The computer-implemented method of claim 12 comprising:

accessing data identifying a set of virtual networks instantiated in a computing environment;

displaying a visual representation of the set of instantiated virtual networks that includes a horizontal linear row of rectangular representations of individual ones of the set of virtual networks;

monitoring throughput on individual ones of the instantiated virtual networks; and reflecting throughput values in connection with the corresponding rectangular representations of the individual instantiated virtual networks.

* * * * *

UNITED STATES PATENT AND TRADEMARK OFFICE
CERTIFICATE OF CORRECTION

PATENT NO. : 9,053,577 B2
APPLICATION NO. : 13/282564
DATED : June 9, 2015
INVENTOR(S) : Rory Fergus Roche et al.

Page 1 of 1

It is certified that error appears in the above-identified patent and that said Letters Patent is hereby corrected as shown below:

In The Drawings

In sheet 10 of 15, reference numeral 456, line 1, delete "ACTIVTY" and insert -- ACTIVITY --, therefor.

In sheet 10 of 15, reference numeral 552, line 3, delete "INSTANTED" and insert -- INSTANTIATED --, therefor.

In The Claims

In column 21, line 45, in Claim 12, delete "monitories" and insert -- monitoring --, therefor.

In column 21, line 47, in Claim 12, delete "reflect" and insert -- reflecting --, therefor.

Signed and Sealed this
Twenty-third Day of February, 2016

Michelle K. Lee
*Director of the United States Patent and Trademark Office*